US009800112B2

(12) United States Patent
Egami et al.

(10) Patent No.: US 9,800,112 B2
(45) Date of Patent: Oct. 24, 2017

(54) ELECTRICAL COLLECTING AND DISTRIBUTING MEMBER HOLDING STRUCTURE, ELECTRIC MOTOR, AND ELECTRIC MOTOR PRODUCING METHOD

(71) Applicants: Hitachi Metals, Ltd., Tokyo (JP); Honda Motor Co., Ltd., Tokyo (JP)

(72) Inventors: Kenichi Egami, Kitaibaraki (JP); Manabu Yazaki, Wako (JP)

(73) Assignees: HITACHI METALS, LTD, Tokyo (JP); HONDA MOTOR CO., LTD., Tokyo (JP)

( * ) Notice: Subject to any disclaimer, the term of this patent is extended or adjusted under 35 U.S.C. 154(b) by 502 days.

(21) Appl. No.: 14/468,401

(22) Filed: Aug. 26, 2014

(65) Prior Publication Data

US 2015/0061431 A1  Mar. 5, 2015

(30) Foreign Application Priority Data

Aug. 27, 2013  (JP) .................................. 2013-175266

(51) Int. Cl.
*H02K 3/28* (2006.01)
*H02K 3/52* (2006.01)

(52) U.S. Cl.
CPC ........ *H02K 3/522* (2013.01); *Y10T 29/49009* (2015.01)

(58) Field of Classification Search
CPC ...................................................... H02K 3/28
USPC .......................................................... 310/71
See application file for complete search history.

(56) References Cited

U.S. PATENT DOCUMENTS

| | | | | |
|---|---|---|---|---|
| 7,476,995 | B2 * | 1/2009 | Uchiyama | H02K 3/505 310/179 |
| 8,154,163 | B2 | 4/2012 | Inoue et al. | |
| 2009/0256439 | A1 * | 10/2009 | Inoue | H02K 3/522 310/71 |
| 2010/0060090 | A1 * | 3/2010 | Sakata | H02K 3/522 310/71 |
| 2012/0013210 | A1 | 1/2012 | Fujii et al. | |

(Continued)

FOREIGN PATENT DOCUMENTS

| | | |
|---|---|---|
| JP | 2003324887 A | 11/2003 |
| JP | 2004194367 A | 7/2004 |
| JP | 2005229677 A | 8/2005 |

(Continued)

OTHER PUBLICATIONS

Japanese Office Action for corresponding Japanese Patent Application No. 2013-175266 dated Jul. 26, 2016 and English translation thereof.

*Primary Examiner* — Naishadh Desai
(74) *Attorney, Agent, or Firm* — Roberts Mlotkowski Safran Cole & Calderon P.C.

(57) ABSTRACT

An electrical collecting and distributing member holding structure is composed of a stator including a multiplicity of cores arranged annularly, windings wound around the multiplicity of cores respectively, and an insulator for electrical insulation between the cores and the windings, a plurality of annular electrical collecting and distributing members held around the stator to collect and distribute electric current to the windings, and a holding portion formed on the insulator. The plurality of electrical collecting and distributing members are being held in the holding portion.

11 Claims, 13 Drawing Sheets

(56) References Cited

U.S. PATENT DOCUMENTS

2014/0246934 A1    9/2014   Egami et al.

FOREIGN PATENT DOCUMENTS

| JP | 2005312207 A | 11/2005 |
| JP | 2006333666 A | 12/2006 |
| JP | 2007-174869 A | 7/2007 |
| JP | 2009-261082 A | 11/2009 |
| JP | 2009261094 A | 11/2009 |
| JP | 2010226832 A | 10/2010 |
| WO | 2012141135 A1 | 10/2012 |

\* cited by examiner

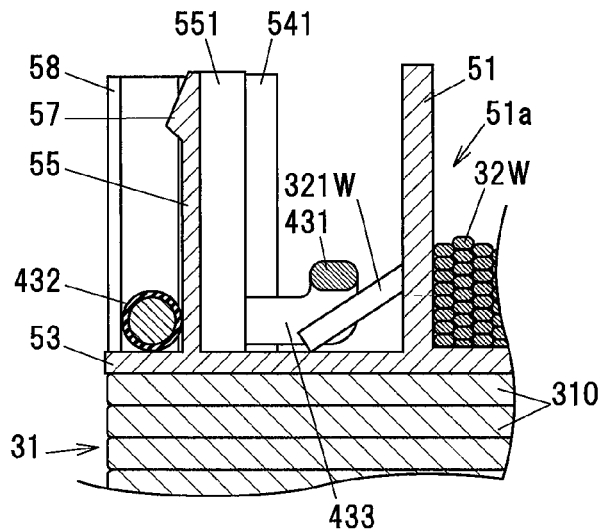
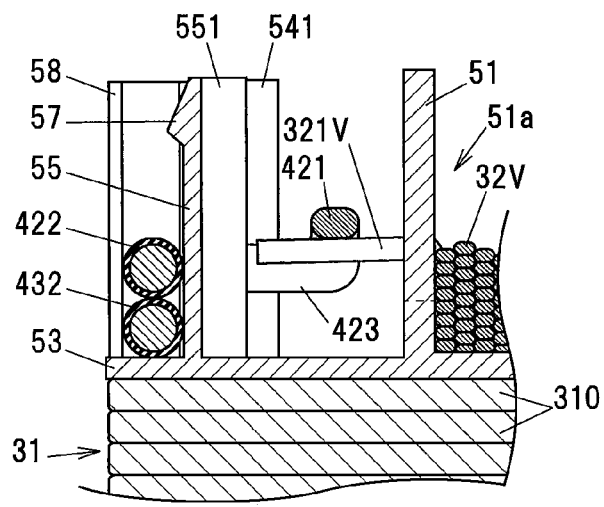
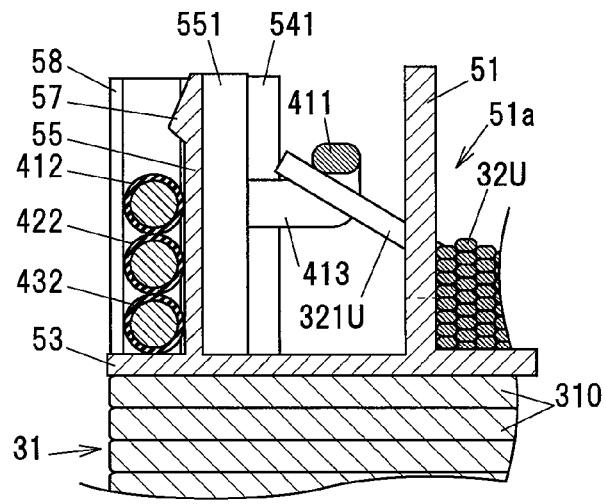

ELECTRICAL COLLECTING AND DISTRIBUTING MEMBER HOLDING STRUCTURE, ELECTRIC MOTOR, AND ELECTRIC MOTOR PRODUCING METHOD

The present application is based on Japanese patent application No. 2013-175266 filed on Aug. 27, 2013, the entire contents of which are incorporated herein by reference.

BACKGROUND OF THE INVENTION

1. Field of the Invention

This invention relates to a holding structure for electrical collecting and distributing members to collect and distribute electric current to windings, an electric motor and an electric motor producing method.

2. Description of the Related Art

In the past, an electric motor has been suggested that includes multiple phase windings wound around annularly arranged multiple cores respectively, an insulator made of an electrically insulating member interposed between the cores and the windings for electrical insulation therebetween, and annular electrical collecting and distributing members arranged coaxially with the multiple cores to collect and distribute electric current to the multiple phase windings. (See e.g., JP-A-2009-261082.)

The electrical collecting and distributing ring in the motor described in JP-A-2009-261082 includes bus rings as the plurality of coaxially arranged electrical collecting and distributing members, and a plurality of fixing members, which fix the plurality of bus rings together. The plurality of fixing members are spaced in a circumferential direction of the plurality of bus rings in such a manner that connecting terminals connected to a respective one of the plurality of bus rings are located between the plurality of fixing members, and the plurality of fixing members are formed by molding.

The plurality of fixing members include a respective projecting portion, which projects outward from an outer surface in a radial direction, and this projecting portion is mountable into a hole provided on an outer peripheral wall of an electrically insulating bobbin. This electrically insulating bobbin is made of an electrically insulative resin material mounted around the iron cores, and serves as an insulator for electrical insulation between the iron cores and the windings.

Refer to JP-A-2009-261082 and JP-A-2007-174869, for example.

SUMMARY OF THE INVENTION

The motor described in JP-A-2009-261082 requires a mold for molding the fixing members, and also its fabrication process requires the molding which involves setting the plurality of bus rings in this mold, and injecting a resin into a cavity. This has led to an increase in production cost of the motor due to the molding of the fixing members.

Accordingly, it is an object of the present invention to provide an electrical collecting and distributing member holding structure, an electric motor, and an electric motor producing method, which allow for reducing production cost therefor.

(1) According to a first embodiment of the invention, an electrical collecting and distributing member holding structure comprises:

a stator including a multiplicity of cores arranged annularly, windings wound around the multiplicity of cores respectively, and an insulator for electrical insulation between the cores and the windings;

a plurality of annular electrical collecting and distributing members held around the stator to collect and distribute electric current to the windings; and a holding portion formed on the insulator, the plurality of electrical collecting and distributing members being held in that holding portion.

In the first embodiment, the following modifications and changes can be made.

(i) The holding portion includes a supporting portion, which supports the plurality of electrical collecting and distributing members together in an axial direction of the stator, and a regulating portion to regulate movement in the axial direction of the plurality of electrical collecting and distributing members relative to that supporting portion.

(ii) The regulating portion includes a projection, which is provided at an end of the supporting portion in the axial direction of the stator, and which projects in a radial direction of the stator, so that the plurality of electrical collecting and distributing members are held in the holding portion by crossing over that projection when moved in the axial direction relative to the holding portion.

(iii) The supporting portion extends in the axial direction of the stator, and the plurality of electrical collecting and distributing members are held on an outer side of the supporting portion in the radial direction of the stator.

(iv) The holding portion further includes a peripheral wall, which is formed outward in the radial direction of the stator relative to the plurality of electrical collecting and distributing members, and which is opposite the plurality of electrical collecting and distributing members in the radial direction of the stator.

(v) The electrical collecting and distributing members integrally include a respective U shaped portion, which is formed by bending a metal conductor into a U shape, respective held portions, which are held in the holding portion, and a respective pair of extended portions, which are provided between both ends of the respective U shaped portion and the respective held portions, respectively, by extension in a radial direction of the annular electrical collecting and distributing members, wherein the electrical collecting and distributing members and the windings are electrically connected together with a respective end of the windings inserted in the respective U shaped portion.

(vi) The electrical collecting and distributing members and the windings are electrically connected together by caulking the respective U shaped portion with the respective end of the windings inserted therein.

(vii) The respective U shaped portion is plated with tin, and the electrical collecting and distributing members and the windings are electrically connected together by heat caulking the respective U shaped portion with the respective end of the windings inserted therein.

(viii) The respective pair of extended portions are not in contact with each other with the respective U shaped portion electrically connected to the respective end of the windings.

(ix) A plurality of the supporting portions are arranged on the stator and spaced in a circumferential direction of the stator, and the electrical collecting and distributing members are arranged in such a manner that respective connecting portions thereof to be connected to the windings project from between pairs of the adjacent supporting portions in the circumferential direction of the stator inward in radial directions, respectively, of the stator.

(x) A pitch between the pairs of the adjacent supporting portions in the circumferential direction of the stator accommodates a width of the respective connecting portions in circumferential directions of the electrical collecting and distributing members.

(xi) The plurality of electrical collecting and distributing members are in identical shapes.

(xii) At least some of the plurality of windings are bent depending on locations of the plurality of electrical collecting and distributing members, respectively, in the axial direction of the stator.

(2) According to a second embodiment of the invention, an electric motor comprises:

a stator including a multiplicity of cores arranged annularly, U, V, and W phase windings wound around the multiplicity of cores respectively, and an insulator for electrical insulation between the cores and the U, V, and W phase windings;

a first annular electrical collecting and distributing member to collect and distribute electric current to the U phase winding;

a second annular electrical collecting and distributing member to collect and distribute electric current to the V phase winding; and a third annular electrical collecting and distributing member to collect and distribute electric current to the W phase winding, wherein the insulator includes a holding portion, and the first, second, and third electrical collecting and distributing members are being held in that holding portion.

In the second embodiment, the following modifications and changes can be made.

The electric motor further comprises a fourth neutral phase annular electrical collecting and distributing member, which is held in the holding portion together with the first, second, and third electrical collecting and distributing members, and which is connected to the U, V, and W phase windings, wherein the fourth electrical collecting and distributing member includes a multiplicity of connecting portions, which are in a U shape being open inward in radial directions, respectively, of the fourth annular electrical collecting and distributing member, and the fourth electrical collecting and distributing member is electrically connected to the U, V, and W phase windings by caulking its connecting portions with respective ends of the U, V, and W phase windings inserted therein respectively.

(3) According to a third embodiment of the invention, a method for producing the electric motor as specified in (2) above comprises:

holding the first, second, and third electrical collecting and distributing members in the holding portion; and connecting together the U, V, and W phase windings and the first, second, and third electrical collecting and distributing members, respectively.

In the third embodiment, the following modifications and changes can be made.

(i) The electric motor producing method further comprises bending at least some of the U, V, and W phase windings depending on locations of the first, second, and third electrical collecting and distributing members, respectively, in an axial direction of the stator, and aligning the U, V, and W phase windings with connecting portions of the first, second, and third electrical collecting and distributing members, respectively.

(ii) With the fourth electrical collecting and distributing member elastically radially contracted, the respective ends of the U, V, and W phase windings are inserted into the connecting portions, respectively, of the fourth electrical collecting and distributing member, and due to radial expansion of the fourth electrical collecting and distributing member caused by restoration, the respective ends of the U, V, and W phase windings are located deep into the connecting portions, respectively.

(Points of the Invention)

The present invention allows for holding the electrical collecting and distributing members directly in the insulator and thereby reducing its production cost.

BRIEF DESCRIPTION OF THE DRAWINGS

The preferred embodiments according to the invention will be explained below referring to the drawings, wherein:

FIGS. 10A to 10C are explanatory diagrams showing a holding step and an aligning step;

DETAILED DESCRIPTION OF THE PREFERRED EMBODIMENTS

First Embodiment (Entire Electric Motor Configuration)

Figure 1:
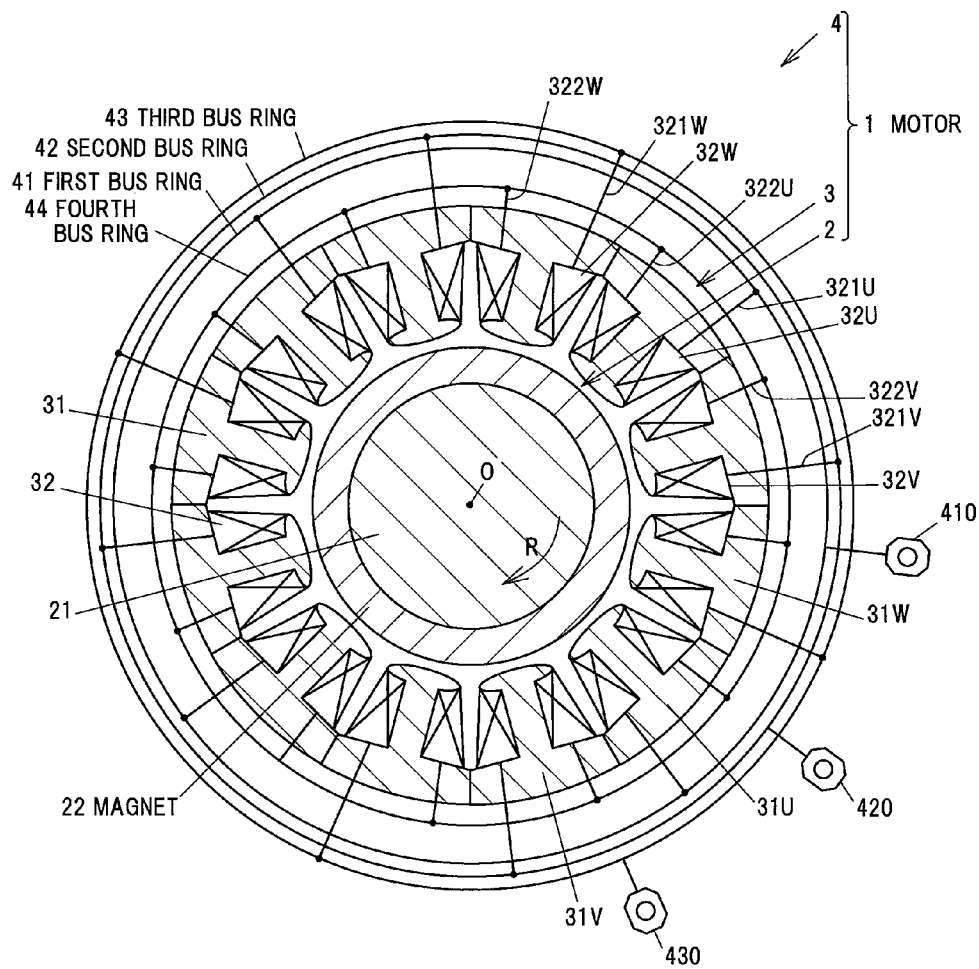
FIG. 1 is a schematic diagram showing a configuration example of an electric motor with an electrical collecting and distributing ring in a first embodiment according to the present invention.

FIG. 1 is a schematic diagram showing a configuration example of an electric motor 1 with an electrical collecting and distributing ring 4 in a first embodiment according to the present invention.

This motor 1 includes a rotor 2, which is a rotating part, a stator 3, which is a stationary part, and the electrical collecting and distributing ring 4 comprising first to fourth bus rings 41 to 44 held around the stator 3.

The rotor 2 includes a shaft 21, which is supported pivotally and coaxially with the stator 3 by a bearing not shown, and a cylindrical magnet 22 having a plurality of magnetic poles, which are fixed around an outer peripheral surface of the shaft 21.

The stator 3 includes a multiplicity of cores 31 arranged annularly, outer peripheral windings 32 wound around the cores 31 respectively, and insulators 33 (shown in FIG. 2) to be described later. In this embodiment, the 24 cores 31 are arranged in a circumferential direction of the stator 3. These 24 cores 31 are classified into U phase cores 31U, V phase cores 31V and W phase cores 31W, depending on locations thereof, and, in a rotating direction R of the rotor 2 shown in FIG. 1, the V phase cores 31V are arranged next to the U phase cores 31U respectively, the W phase cores 31W are arranged next to the V phase cores 31V respectively, and the U phase cores 31U are arranged next to the W phase cores 31W respectively.

The windings 32 wound around the U phase cores 31U are U phase windings 32U, the windings 32 wound around the V phase cores 31V are V phase windings 32V, and the windings 32 wound around the W phase cores 31W are W phase windings 32W. Electrical collection and distribution to the U phase windings 32U is performed by a first bus ring 41. Electrical collection and distribution to the V phase windings 32V is performed by a second bus ring 42. Also, electrical collection and distribution to the W phase windings 32W is performed by a third bus ring 43.

Of both respective ends of the U phase windings 32U, respective one ends 321U are electrically connected to the first bus ring 41, while respective other ends 322U are electrically connected to the fourth bus ring 44. Of both respective ends of the V phase windings 32V, respective one ends 321V are electrically connected to the second bus ring 42, while respective other ends 322V are electrically connected to the fourth bus ring 44. Also, of both respective ends of the W phase windings 32W, respective one ends 321W are electrically connected to the third bus ring 43, while respective other ends 322W are electrically connected to the fourth bus ring 44.

The first bus ring 41 is given as one example of the first electrical collecting and distributing member of the present invention, and the second bus ring 42 is given as one example of the second electrical collecting and distributing member of the present invention. Also, the third bus ring 43 is given as one example of the third electrical collecting and distributing member of the present invention. The fourth bus ring 44 is given as one example of the fourth neutral phase electrical collecting and distributing member.

The first, second, and third bus rings 41, 42, and 43 are connected with feeding terminals 410, 420, and 430, respectively, so that the first, second, and third bus rings 41, 42, and 43 are provided with sine wave driving currents, respectively, each being 120 degrees out of phase from the others, from the inverter not shown, through those feeding terminals 410, 420, and 430. The driving currents produce a rotating magnetic field in the stator 3. The magnet 22 is acted on by a rotational force resulting from attractive and repulsive forces due to the rotating magnetic field, and this rotational force results in a rotation about rotation axis O of the shaft 21. The first, second, and third bus rings 41, 42, and 43 are fixed to the stator 3 by a holding structure to be described later.

Figure 2A:
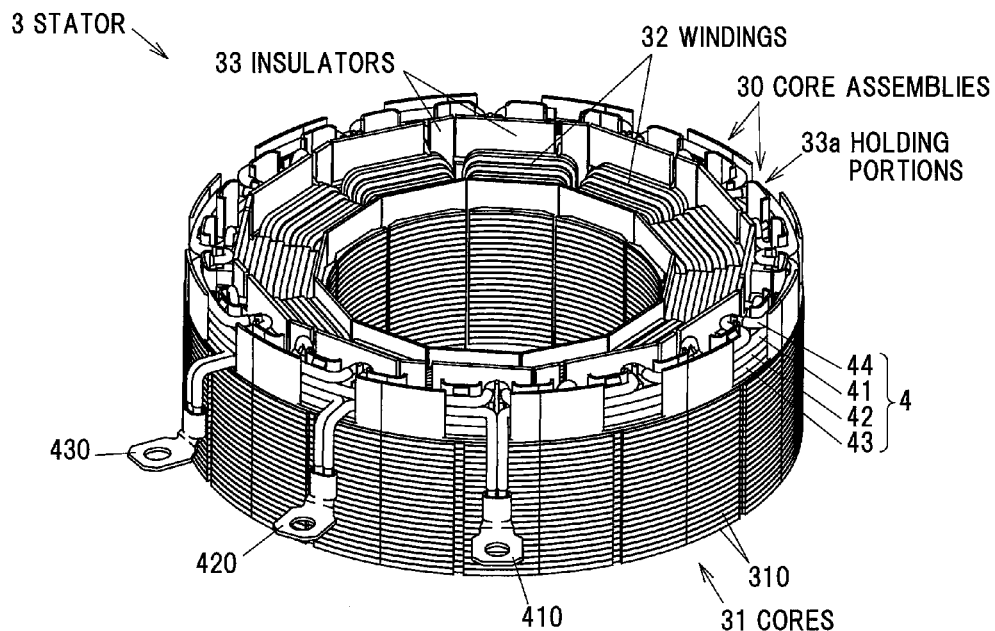
FIG. 2A is a perspective view showing a stator and first, second, third, and fourth bus rings.
Figure 2B:
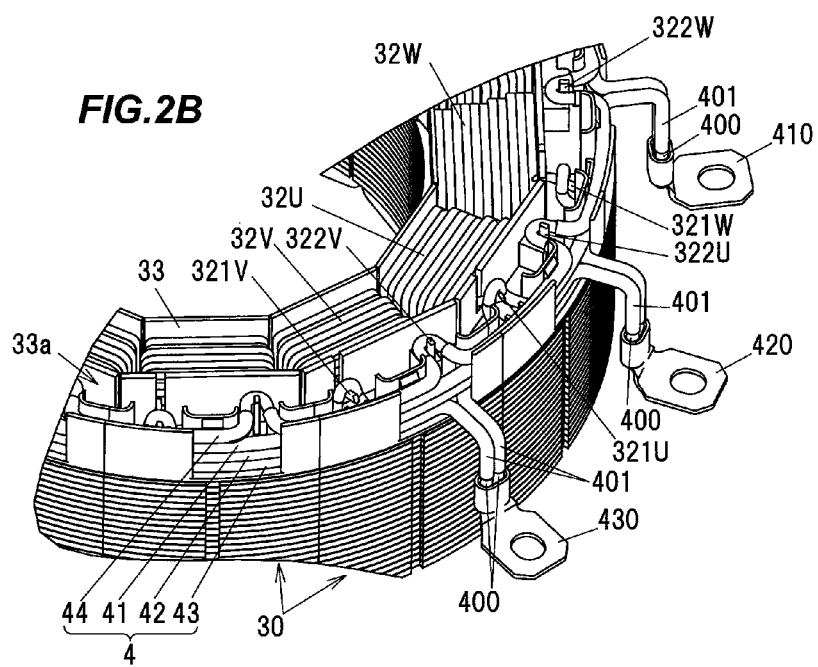
FIG. 2B is a partial enlarged view of FIG. 2A.
Figure 3:
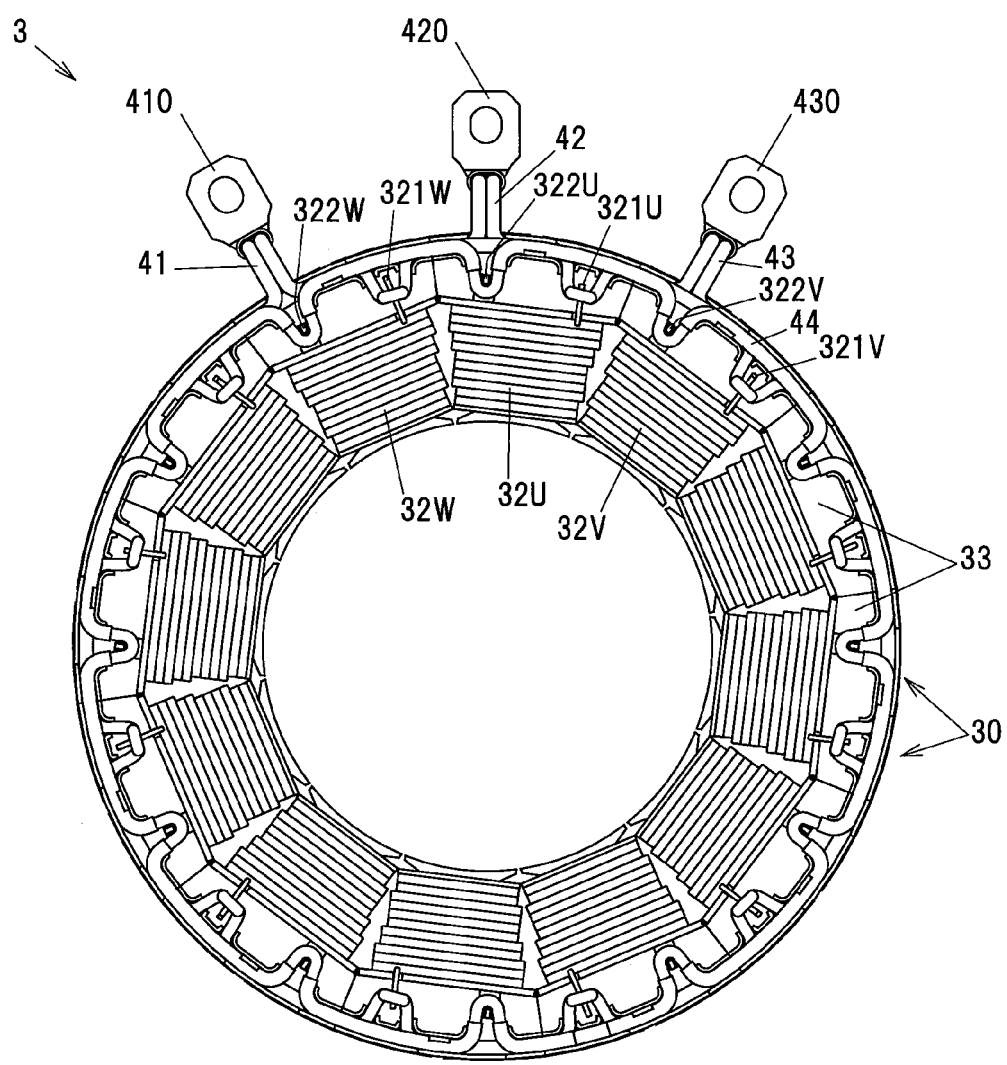
FIG. 3 is a plan view showing the stator and the first, second, third, and fourth bus rings viewed in a central axis direction thereof.
Figure 4:
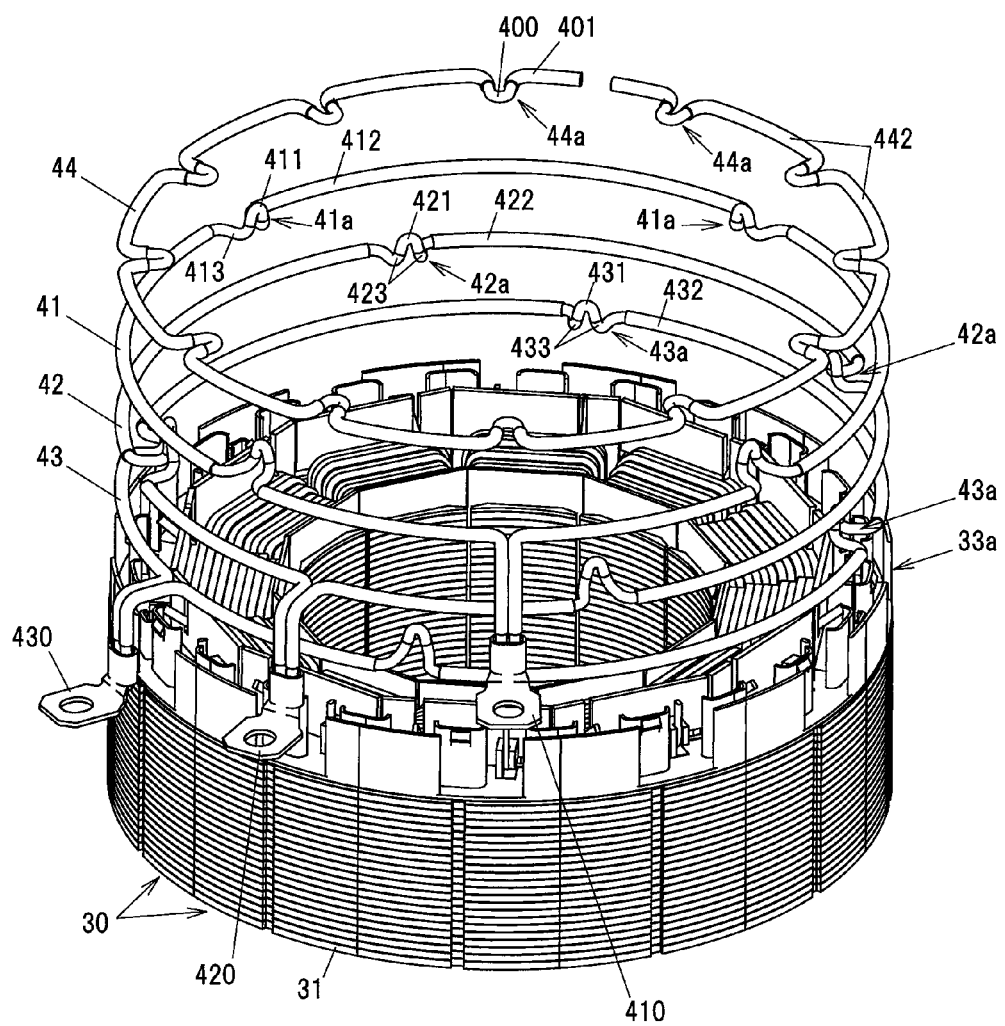
FIG. 4 is an exploded perspective view showing the first, second, third, and fourth bus rings separated from the stator.

FIG. 2A is a perspective view showing the stator 3 and the first, second, third, and fourth bus rings 41, 42, 43, and 44 but without showing the rotor 2. FIG. 2B is a partial enlarged view of FIG. 2A. FIG. 3 is a plan view showing the stator 3 and the first, second, third, and fourth bus rings 41, 42, 43, and 44 viewed in a central axis direction thereof. FIG. 4 is an exploded perspective view showing the first, second, third, and fourth bus rings 41, 42, 43, and 44 separated from the stator 3. Note that, herein, the axial direction, the radial direction, and the circumferential direction of the stator 3 may simply be referred to as "the axial direction," "the radial direction," and "the circumferential direction," respectively.

The stator 3 comprises a multiplicity of core assemblies 30 including the cores 31 comprising a multiplicity of laminated magnetic steel sheets 310, insulators 33 mounted to the cores 31 respectively, and the outer peripheral windings 32 wound around the cores 31 respectively with the insulators 33 therebetween respectively. In this embodiment, the stator 3 is formed in a ring shape by annularly arranging the twelve core assemblies 30.

The insulators 33 have holding portions 33a respectively for holding the first, second, third, and fourth bus rings 41, 42, 43, and 44. The first, second, third, and fourth bus rings 41, 42, 43, and 44 are arranged concentrically on top of each other in an axial direction of the stator 3, and are held in the holding portions 33a. A configuration of the holding portions 33a will be described in detail later.

The holding portions 33a are provided around an outer periphery of the stator 3 relative to the windings 32 (the U phase windings 32U, the V phase windings 32V and the W phase windings 32W). The respective one ends 321U, 321V, and 321W of the windings 32 are extended outward in radial directions, respectively, of the stator 3, and are connected to the first, second, and third bus rings 41, 42, and 43, respectively. The respective other ends 322U, 322V, and 322W of the windings 32 are drawn out of the insulators 33 respectively in the axial direction, and are connected to the fourth bus ring 44.

The first, second, third, and fourth bus rings 41, 42, 43, and 44 are formed by bending an insulated wire which is formed by coating a linear central conductor (metal conductor) 400 made of a metal having good electrical conductivity, such as copper, with an insulator 401 made of a resin. At both the respective ends of the first, second, and third bus rings 41, 42, and 43, their respective central conductors 400 are exposed from their respective insulators 401 respectively, so that their respective exposed central conductor 400 portions are connected by crimping to the feeding terminals 410, 420, and 430, respectively. In other words, the first, second, and third bus rings 41, 42, and 43 are formed by annularly forming their respective central conductors 400 respectively, and both the respective ends of their respective central conductors 400 are connected to one terminal (i.e., the feeding terminal 410, 420, and 430 respectively). Note that, in the present embodiment, the respective central conductors 400 are each formed of a solid wire, but the respective central conductors 400 may each be a stranded wire, which comprises a plurality of wires stranded together.

As shown in FIG. 4, the first bus ring 41 includes connecting portions 41*a* at four locations respectively in the circumferential direction, which are connected to the respective one ends 321U respectively of the U phase windings 32U. The second bus ring 42 includes connecting portions 42*a* at four locations respectively in the circumferential direction, which are connected to the respective one ends 321V respectively of the V phase windings 32V. Also, the third bus ring 43 includes connecting portions 43*a* at four locations respectively in the circumferential direction, which are connected to the respective one ends 321W respectively of the W phase windings 32W. For these connecting portions 41*a*, 42*a*, and 43*a*, their respective insulators 401 are removed to expose their respective central conductors 400. In this embodiment, the first, second, and third bus rings 41, 42, and 43 are identically shaped.

The fourth bus ring 44 is held in the holding portion 33*a* together with the first, second, and third bus rings 41, 42, and 43, and includes connecting portions 44*a* at twelve locations respectively in the circumferential direction, which are electrically connected to the respective other ends 322U, 322V, and 322W of the windings 32. In the same manner as the respective connecting portions 41*a*, 42*a*, and 43*a* of the first, second, and third bus rings 41, 42, and 43, for the connecting portions 44*a*, their respective insulators 401 are removed, to expose their respective central conductors 400. The connection portions 44*a* are in a U shape being open inward in the radial direction.

(Insulator and Core Assembly Configuration)

Figure 5:
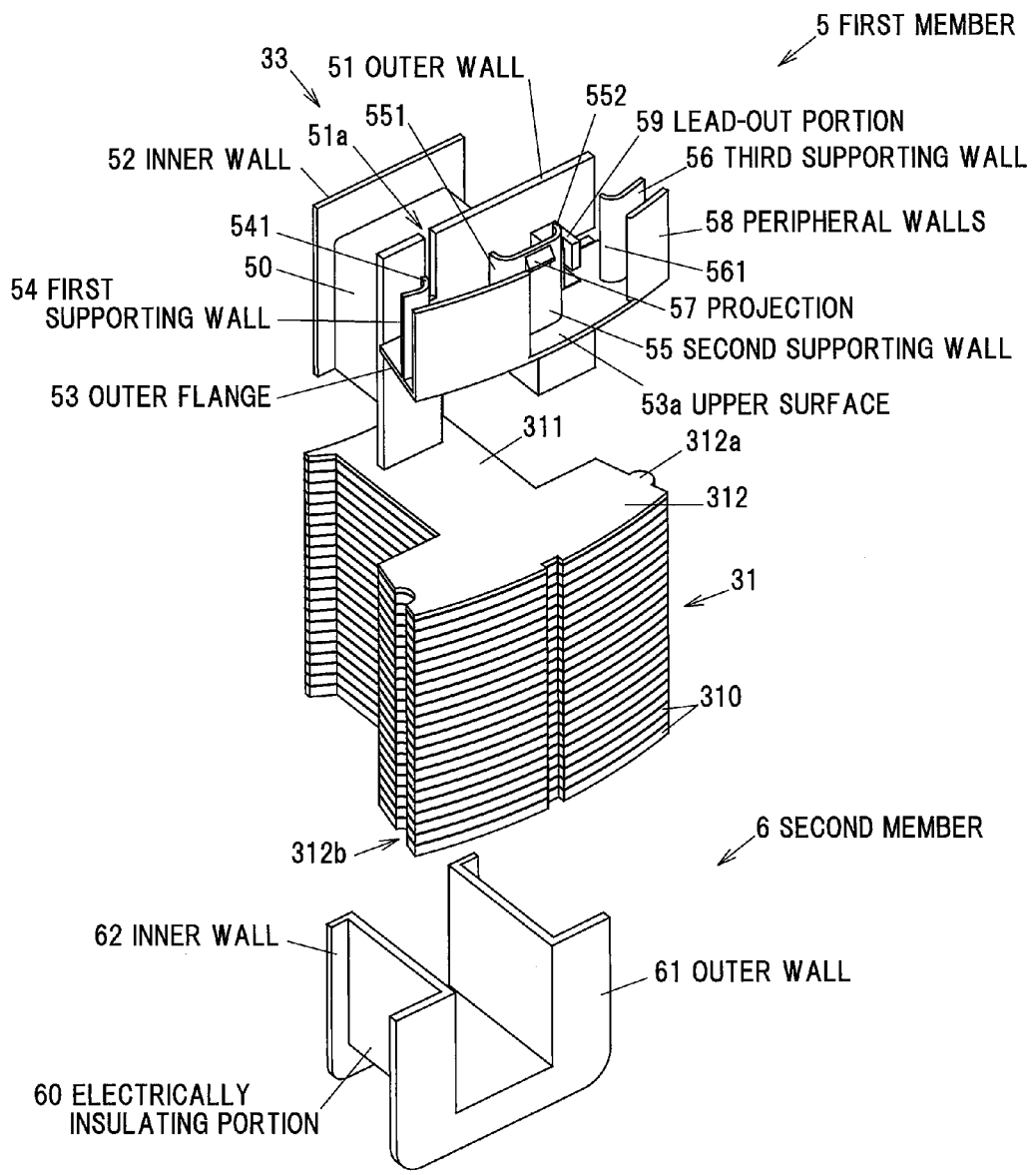
FIG. 5 is a perspective view showing an insulator and a core.
Figure 6A:
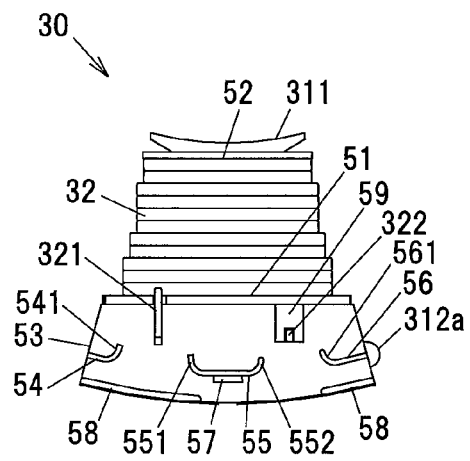
FIG. 6A is a plan view showing a core assembly.
Figure 6B:
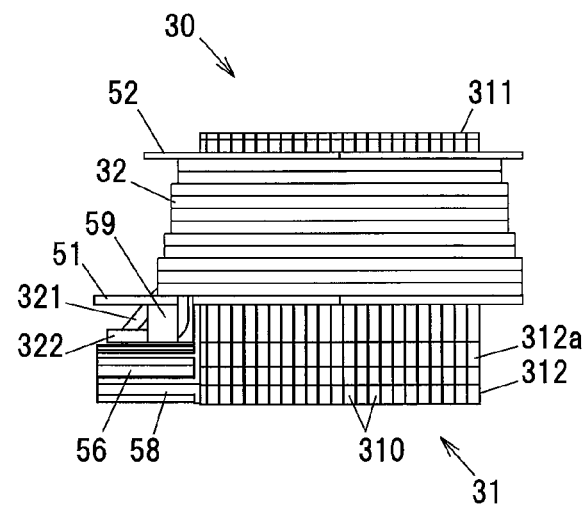
FIG. 6B is a side view showing that core assembly.
Figure 6C:
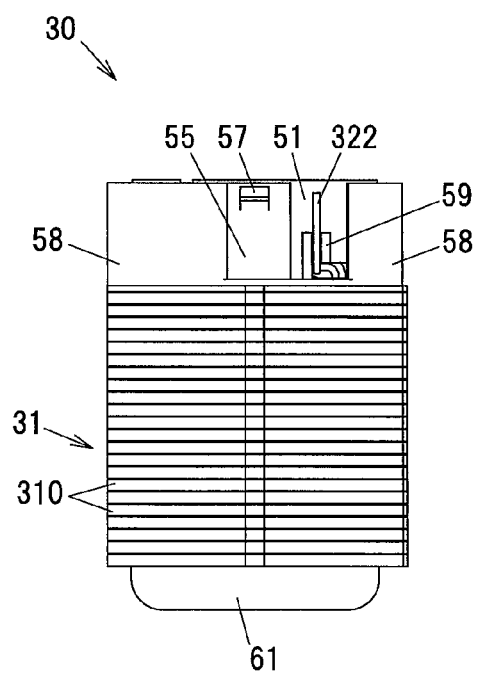
FIG. 6C is a front view showing that core assembly.
Figure 6D:
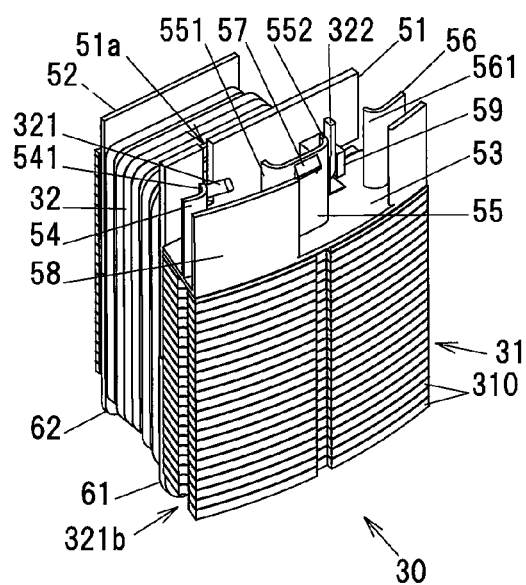
FIG. 6D is a perspective view showing that core assembly.

FIG. 5 is a perspective view showing the insulator 33 and the core 31. FIG. 6A is a plan view showing the core assembly 30. FIG. 6B is a side view showing the core assembly 30. FIG. 6C is a front view showing the core assembly 30. FIG. 6D is a perspective view showing the core assembly 30.

The insulator 33 is formed by combining a first member 5 and a second member 6 together as shown in FIG. 5. The first member 5 and the second member 6 are each made of an insulator such as a resin or the like formed by injection molding. The first member 5 integrally includes an electrically insulating portion 50 interposed between the core 31 and the winding 32, an outer wall 51 and an inner wall 52 opposite each other with the electrically insulating portion 50 therebetween in the radial direction, an outer flange 53 projecting from the outer wall 51 outward around the stator 3 and including an upper surface 53*a* at right angles to the axial direction, first, second, and third supporting walls 54, 55, and 56 erected on the upper surface 53*a* of the outer flange 53, a projection 57 provided at a tip of the second supporting wall 55, a peripheral wall 58 provided along an outer peripheral edge of the outer flange 53 and opposite the first, second, and third supporting walls 54, 55, and 56 in the radial direction, and a lead-out portion 59 provided at a corner between the outer wall 51 and the outer flange 53, with the end 322 of the winding 32 being drawn out therefrom to the upper surface 53*a* side of the outer flange 53.

The second member 6 integrally includes an electrically insulating portion 60 interposed between the core 31 and the winding 32, an outer wall 61 and an inner wall 62 opposite each other with the electrically insulating portion 60 therebetween in the radial direction.

The core 31 integrally includes an extended portion 311 extending in the radial direction and being clamped between the electrically insulating portion 50 of the first member 5 and the electrically insulating portion 60 of the second member 6, and a back yoke 312 formed continuously on an outer side of the extended portion 311 in the radial direction and extending in the circumferential direction. The back yoke 312 includes a circular arc shaped convex portion 312*a* on its end on one side in the circumferential direction, and is formed with a concave portion 312*a* on its end on the other side in the circumferential direction. The convex portion 312*a* is mated into the concave portion 312*a* of the other adjacent core 31. Also, the extended portion 311 is formed in such a manner that its inner end in the radial direction spreads in the circumferential direction.

The first member 5 and the second member 6 are combined together in such a manner as to clamp the extended portion 311 of the core 31 between the electrically insulating portions 50 and 60 in the axial direction of the stator 3. The combining together of the first member 5 and the second member 6 results in the outer wall 51 of the first member 5 and the outer wall 61 of the second member 6 being shaped into a single continuous wall, while the inner wall 52 of the first member 5 and the inner wall 62 of the second member 6 being likewise shaped into a single continuous wall.

As shown in FIGS. 6A to 6D, the winding 32 is wound around an outer periphery of the electrically insulating portions 50 and 60 between the respective outer walls 51 and 61 and the respective inner walls 52 and 62 of the first member 5 and the second member 6. The outer wall 51 of the first member 5 is formed with a notch 51*a* extending from its end in the axial direction toward the upper surface 53*a* of the outer flange 53 so that the one end 321 of the winding 32 projects from this notch 51*a* outward around the stator 3. That one end 321 of the winding 32 is one of the respective one ends 321U, 321V, and 321W of the U, V, and W phase windings 32U, 32V, and 32W, depending on arrangement location of the core assembly 30.

Also, the other end 322 of the winding 32 projects from the lead-out portion 59 in the axial direction. The other end 322 of the winding 32 is one of the respective other ends 322U, 322V, and 322W of the U, V, and W phase windings 32U, 32V, and 32W, depending on arrangement location of the core assembly 30.

The first, second, and third supporting walls 54, 55, and 56 are arranged side by side in the circumferential direction in such a manner that the second supporting wall 55 is arranged between the first supporting wall 54 and the third supporting wall 56. The first supporting wall 54 and the third supporting wall 56 are arranged at both the ends of the outer flange 53 in the circumferential direction. The circumferential direction arrangement of the plurality of the core assemblies 30 results in the first supporting wall 54 being continuous with the third supporting wall 56 of the other adjacent core assembly 30.

The second supporting wall 55 extends from the upper surface 53*a* of the outer flange 53 in the axial direction of the stator 3, and its width in the circumferential direction is formed more narrowly than the space between the notch 51*a* and the lead-out portion 59. The second supporting wall 55 is formed with one pair of guiding portions 551 and 552 at both its ends respectively in its width direction (i.e. in the circumferential direction of the stator 3). The one pair of guiding portions 551 and 552 are in a circular arc shape when viewed in the axial direction, and the outer surface of the second supporting wall 55 in the radial direction is formed smoothly continuously from one guiding portion 551 to the other guiding portion 552.

The first supporting wall 54 is spaced apart from the second supporting wall 55 in the circumferential direction so as to allow the respective connecting portions 41a, 42a, and 43a of the first, second, and third bus rings 41, 42, and 43 to be inserted therebetween. The first, second, and third bus rings 41, 42, and 43 are arranged in such a manner that their respective connecting portions 41a, 42a, and 43a project from between the adjacent first and second supporting walls 54 and 55 in the circumferential direction inward in the radial direction of the stator 3.

The first supporting wall 54 is formed with a guiding portion 541 at its second supporting wall 55 side end. As with the one pair of guiding portions 551 and 552 of the second supporting wall 55, that guiding portion 541 is in a circular arc shape when viewed in the axial direction.

The third supporting wall 56 is spaced apart from the second supporting wall 55 in the circumferential direction so as to allow the connecting portion 44a of the fourth bus ring 44 to be inserted therebetween. The third supporting wall 56 is formed with a guiding portion 561 at its second supporting wall 55 side end. As with the one pair of guiding portions 551 and 552 of the second supporting wall 55, that guiding portion 561 is in a circular arc shape when viewed in the axial direction.

The projection 57 is provided at an end of the second supporting wall 55 in the axial direction of the stator 3, and projects in the radial direction of the stator 3. More specifically, the projection 57 projects from an outer surface of the second supporting wall 55 outward in the radial direction of the stator 3, in the middle in the width direction of the second supporting wall 55.

The peripheral wall 58 is formed outward in the radial direction of the stator 3 relative to the first to fourth bus rings 41 to 44, and is opposite the first to fourth bus rings 41 to 44 in the radial direction of the stator 3. This peripheral wall 58 extends in the circumferential direction of the stator 3 with the first to fourth bus rings 41 to 44 at least partially clamped between it and the first to third supporting walls 54 to 56 in the circumferential direction of the stator 3. Also, the peripheral wall 58 is partially open outward in the radial direction relative to the projection 57 and the lead-out portion 59. This allows for moving in the radial direction a mold for molding the projection 57 and the lead-out portion 59, during injection molding of the first member 5 of the insulator 33.

The first to third supporting walls 54 to 56, the projection 57 and the peripheral wall 58 constitute the holding portion 33a of the insulator 33. With a mold to form the insulator 33, that holding portion 33a (including the first to third supporting walls 54 to 56, the projection 57 and the peripheral wall 58) is formed together with the electrically insulating portion 50, the outer wall 51, the inner wall 52 and the outer flange 53.

Of the first to third supporting walls 54 to 56, the projection 57 and the peripheral wall 58 constituting the holding portion 33a, the first to third supporting walls 54 to 56 each serve as a supporting portion to support the first to fourth bus rings 41 to 44 together in the axial direction of the stator 3. The projection 57 serves as a regulating portion to regulate the movement of the first to fourth bus rings 41 to 44 in the axial direction relative to that supporting portion (i.e., the first to third supporting walls 54 to 56). That is, the holding portion 33a includes the supporting portion, which supports the first to fourth bus rings 41 to 44 together in the axial direction of the stator 3, and the regulating portion, which regulates movement of the first to fourth bus rings 41 to 44 in the axial direction of the stator 3 relative to that supporting portion. Also, the peripheral wall 58 serves as an outer peripheral wall to regulate movement of the first to fourth bus rings 41 to 44 outward in the radial direction of the stator 3.

(First, Second, Third, and Fourth Bus Rings 41, 42, 43, and 44 Configuration)

Figure 7A:
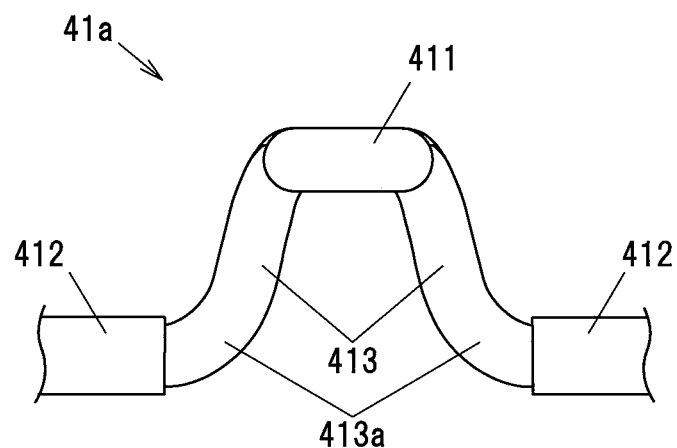
FIG. 7A is a plan view showing a connecting portion of the first bus ring.
Figure 7B:
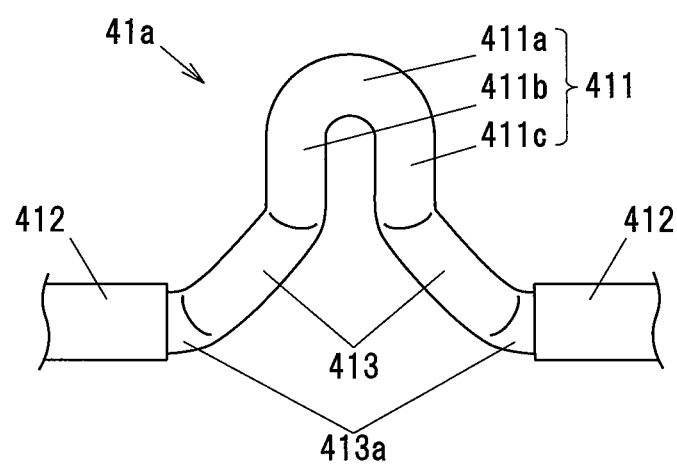
FIG. 7B is a front view showing that connecting portion of the first bus ring.

FIG. 7A is a plan view showing the connecting portion 41a of the first bus ring 41, and FIG. 7B is a front view showing that connecting portion 41a of the first bus ring 41.

The first bus ring 41 integrally includes a U shaped portion 411 which is formed by bending the central conductor 400 into a U shape, held portions 412, which are held in the holding portion 33a, and a pair of extended portions 413, which are provided between both ends of the U shaped portion 411 and the held portions 412, respectively, by extension in a radial direction of the first bus ring 41. The one pair of extended portions 413 of the first bus ring 41 are spaced apart in a circumferential direction thereof so as to allow the one end 321U of the U phase winding 32U to be inserted from the space between the one pair of extended portions 413 into the U shaped portion 411.

The first bus ring 41 includes bent portions 413a between the held portions 412 and the extended portions 413 respectively. The respective bent portions 413a of the one pair of extended portions 413 are spaced apart in the circumferential direction of the first bus ring 41. In this embodiment, respective bend angles of the bent portions 413a (i.e. angles between the held portions 412 and the extended portions 413) are obtuse in such a manner that the space between the one pair of extended portions 413 is narrower inward in a radial direction of the first bus ring 41 (with decreasing distance to the U shaped portion 411). That is, the one pair of extended portions 413 extend obliquely to the radial direction of the first bus ring 41 and inward in the radial direction of the first bus ring 41.

As shown in FIG. 7B, the U shaped portion 411 of the first bus ring 41 comprises a circular arc shaped portion 411a, and one pair of shafts 411b and 411c being opposite each other in the circumferential direction of the first bus ring 41 with the circular arc shaped portion 411a therebetween and extending in an axial direction of the first bus ring 41. With the respective one ends 321U of the U phase windings 32U inserted in the U shaped portions 411 respectively, the first bus ring 41 is electrically connected to the U phase windings 32U.

Also, as shown in FIG. 4, the connecting portions 42a of the second bus ring 42 and the connecting portions 43a of the third bus ring 43 are in the same shape as connecting portions 41a of the first bus ring 41. That is, the connecting portions 42a of the second bus ring 42 integrally include a respective U shaped portion 421 which is formed by bending the central conductor 400 into a U shape, respective held portions 422, which are held in the holding portions 33a respectively, and a respective pair of extended portions 423, which are provided between both ends of the respective U shaped portion 421 and the respective held portions 422, respectively, by extension in a radial direction of the second bus ring 42. Likewise, the connecting portions 43a of the third bus ring 43 integrally include a respective U shaped portion 431 which is formed by bending the central conductor 400 into a U shape, respective held portions 432, which are held in the holding portions 33a respectively, and a respective pair of extended portions 433, which are provided between both ends of the respective U shaped portion 431 and the respective held portions 432, respectively, by extension in a radial direction of the third bus ring 43.

The one pair of extended portions 423 of the second bus ring 42 are spaced apart in a circumferential direction thereof so as to allow the one end 321V of the V phase winding 32V to be inserted from the space between the one pair of extended portions 423 into the U shaped portion 421. Likewise, the one pair of extended portions 433 of the third bus ring 43 are spaced apart in a circumferential direction thereof so as to allow the one end 321W of the W phase winding 32W to be inserted from the space between the one pair of extended portions 433 into the U shaped portion 431.

With the respective one ends 321V of the V phase windings 32V inserted in the U shaped portions 421 respectively, the second bus ring 42 is electrically connected to the V phase windings 32V. Likewise, with the respective one ends 321W of the W phase windings 32W inserted in the U shaped portions 431 respectively, the third bus ring 43 is electrically connected to the W phase windings 32W.

A pitch between the first supporting walls 54 and the second supporting walls 55 accommodates a width of the respective connecting portions 41a, 42a, and 43a of the first, second, and third bus rings 41, 42, and 43 in the circumferential directions of the first, second, and third bus rings 41, 42, and 43. Here, the term "a pitch accommodates a width" refers to a dimension relationship which allows the respective pairs of extended portions 413, 423, and 433 of the first, second, and third bus rings 41, 42, and 43 to be arranged between the first supporting walls 54 and the second supporting wall 55 respectively, and which allows the respective U shaped portions 411, 421, and 431 of the first, second, and third bus rings 41, 42, and 43 to be positioned opposite the notches 51a respectively by abutment in the circumferential direction between the respective pairs of extended portions 413, 423, and 433 of the first, second, and third bus rings 41, 42, and 43 and the respective guiding portions 541 and 551 of the first supporting walls 54 and the second supporting walls 55 respectively.

Also, a pitch between the third supporting walls 56 and the second supporting walls 55 accommodates a width of the connecting portions 44a of the fourth bus ring 44 in the circumferential direction of the fourth bus ring 44. Here, the term "a pitch accommodates a width" refers to a dimension relationship which allows the connecting portions 44a of the fourth bus ring 44 to be arranged between the third supporting walls 56 and the second supporting walls 55 respectively, and which allows the connecting portions 44a of the fourth bus ring 44 to be positioned opposite the lead-out portions 59 respectively by abutment between the connecting portions 44a of the fourth bus ring 44 and the respective guiding portions 552 and 561 of the second supporting walls 55 and the third supporting walls 56 respectively.

Figure 8A:
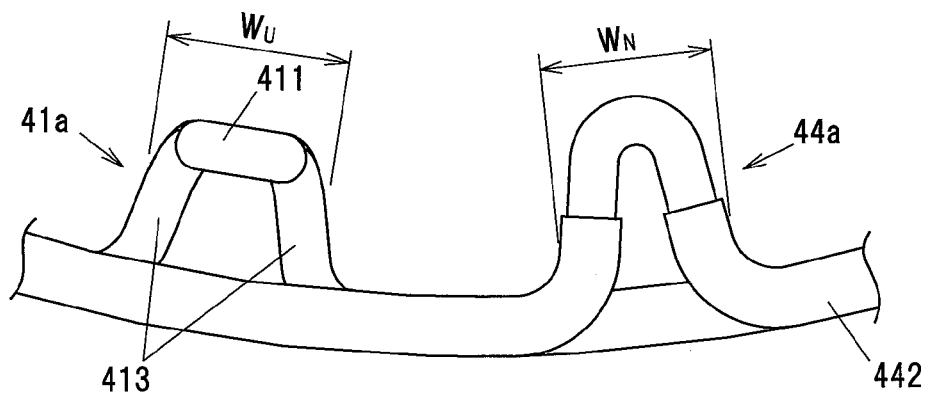
FIG. 8A is a partial plan view showing an electrical collecting and distributing ring viewed in its axial direction.
Figure 8B:
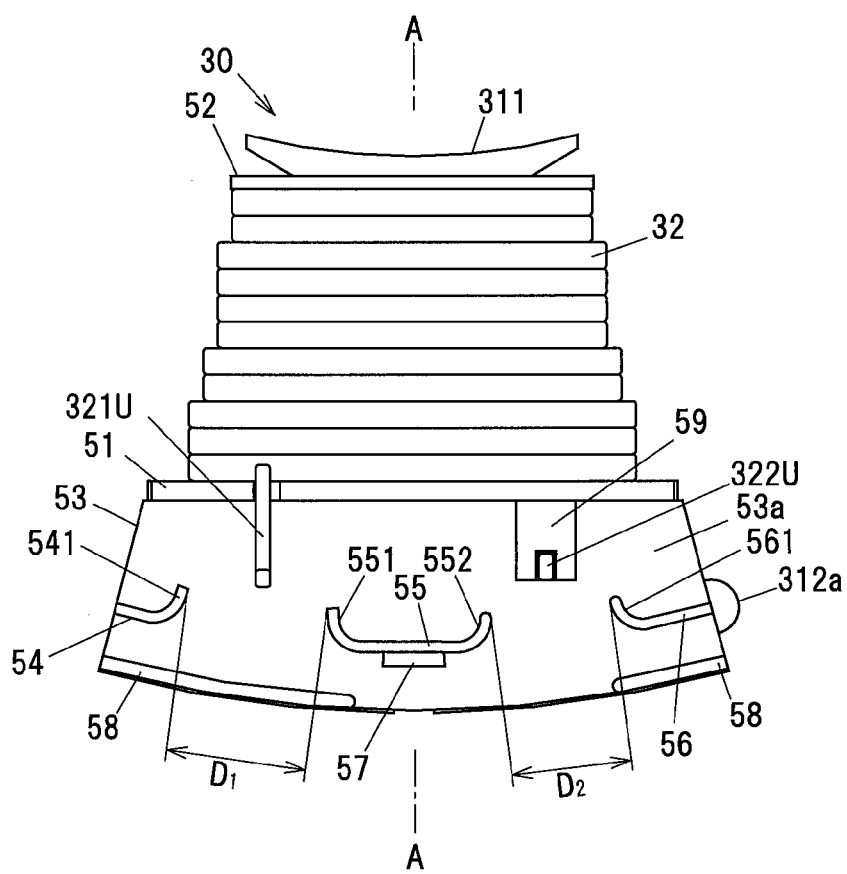
FIG. 8B is a plan view showing the core assembly.

FIG. 8A is a partial plan view showing the electrical collecting and distributing ring 4 viewed in its axial direction, and FIG. 8B is a plan view showing the core assembly 30.

As shown in FIGS. 8A and 8B, when $W_U$ denotes the width in the circumferential direction of the connecting portion 41a of the first bus ring 41, $W_N$ denotes the width in the circumferential direction of the connecting portion 44a of the fourth bus ring 44, $D_1$ denotes the pitch between the first supporting wall 54 and the second supporting wall 55, and $D_2$ denotes the pitch between the third supporting wall 56 and the second supporting wall 55, the pitch $D_1$ is slightly larger than the width $W_U$, while the pitch $D_2$ is slightly larger than the width $W_N$. The pitch $D_1$ is, for example, not less than 1.01 and not more than 1.1 times the width $W_U$. Also, the pitch $D_2$ is, for example, not less than 1.01 and not more than 1.1 times the width $W_N$.

This allows the connecting portion 41a of the first bus ring 41 to be positioned by fitting between the first supporting wall 54 and the second supporting wall 55. Therefore, the insertion of the one end 321U of the winding 32U in the U shaped portion 411 is facilitated. Also, the connecting portion 44a of the fourth bus ring 44 can be positioned by fitting between the third supporting wall 56 and the second supporting wall 55, and therefore the insertion of the other end 322U of the U phase winding 32U in the connecting portion 44a is facilitated.

Note that the pitch $D_1$ is the minimum pitch between the first supporting wall 54 and the second supporting wall 55 (i.e., the space between the circumferential direction end of the guiding portion 541 of the first supporting wall 54 and the circumferential direction end the second supporting wall 55 of the guiding portion 551), while the pitch $D_2$ is the minimum pitch between the third supporting wall 56 and the second supporting wall 55 (i.e., the space between the circumferential direction end of the guiding portion 561 of the third supporting wall 56 and the circumferential direction end of the guiding portion 552 of the second supporting wall 55). Also, the width $W_U$ in the circumferential direction of the connecting portion 41a of the first bus ring 41 is the width in the circumferential direction of the pair of extended portions 413 between the circumferential direction end of the guiding portion 541 of the first supporting wall 54 and the circumferential direction end of the guiding portion 551 of the second supporting wall 55, while the width $W_N$ in the circumferential direction of the connecting portion 44a of the fourth bus ring 44 is the width in the circumferential direction of the connecting portion 44a between the circumferential direction end of the guiding portion 561 of the third supporting wall 56 and the circumferential direction end of the guiding portion 552 of the second supporting wall 55.

Also, in FIG. 8A, the connecting portion 41a of the first bus ring 41 is shown as an example. The widths in the circumferential direction of the respective connecting portions 42a and 43a of the second and third bus rings 42 and 43 are the same as the width $W_U$ in the circumferential direction of the connecting portion 41a of the first bus ring 41. The respective connecting portions 42a and 43a of the second and third bus rings 42 and 43 can likewise be positioned by fitting between the first supporting walls 54 and the second supporting walls 55 respectively.

(First to Fourth Bus Rings 41 to 44 Holding Structure)

Figure 9A:
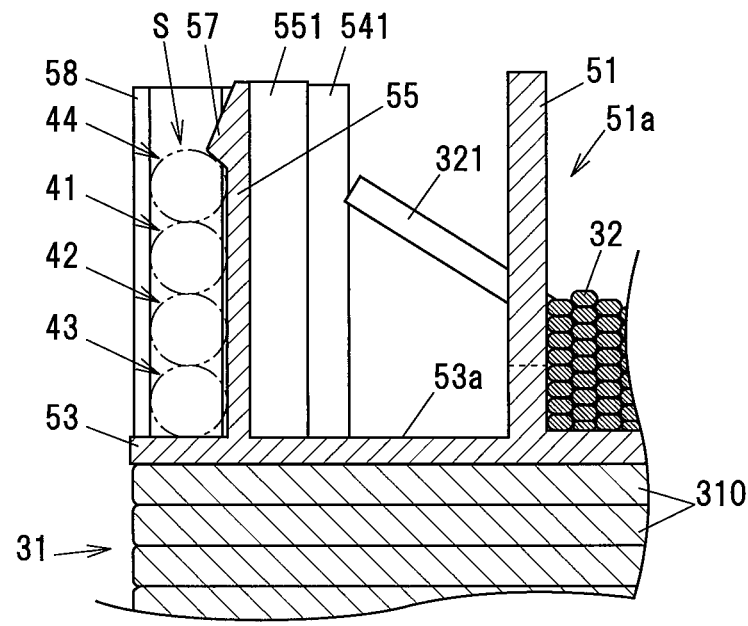
FIG. 9A is one cross-sectional view taken along line A-A in FIG. 8B showing the core assembly.
Figure 9B:
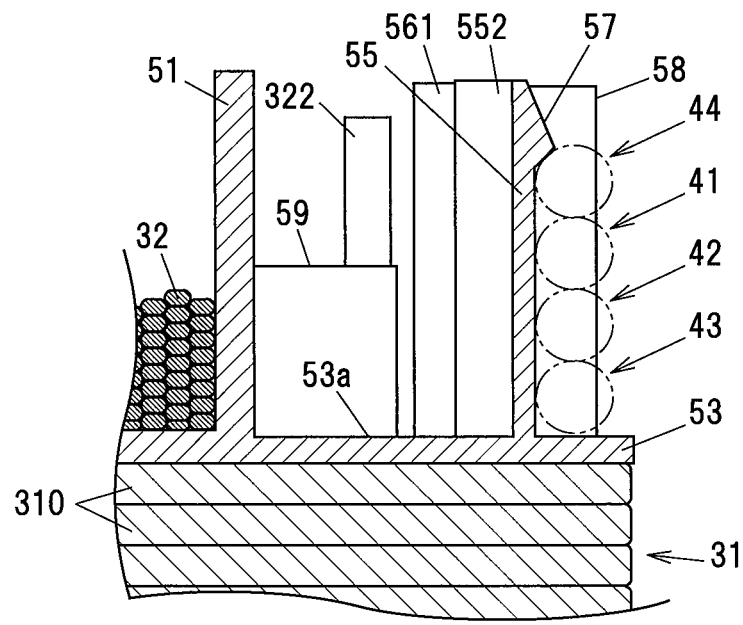
FIG. 9B is the other cross-sectional view taken along line A-A in FIG. 8B showing the core assembly.

FIG. 9A is a cross-sectional view taken along line A-A in FIG. 8B showing a first supporting wall 54 side of the core assembly 30, while FIG. 9B is a cross-sectional view taken along line A-A in FIG. 8B showing a third supporting wall 56 side of the core assembly 30. In FIGS. 9A and 9B, the respective held portions 412, 422, and 432 of the first to fourth bus rings 41 to 44 held by the holding portions 33a of the insulators 33 are indicated by alternate long and two short dashes lines.

The first to fourth bus rings 41 to 44 are arranged on respective inner sides of the peripheral walls 58, and are held on respective outer sides in the radial direction of the first to third supporting walls 54 to 56. The first to fourth bus rings 41 to 44 held by the holding portion 33a of the insulator 33 are arranged on top of each other in the axial direction in such a manner that the third bus ring 43 is arranged in contact with the upper surface 53a of the outer flange 53, the second bus ring 42 is arranged on top of the third bus ring 43, the first bus ring 41 is arranged on top of the second bus ring 42, and the fourth bus ring 44 is arranged on top of the first bus ring 41.

The first to fourth bus rings 41 to 44 are held in the holding portion 33a by axial moving relative to the holding portion 33a and crossing over the projection 57 provided at a tip of the second supporting wall 55. That is, the first to fourth bus rings 41 to 44 are held in the holding portion 33a by crossing over the projection 57 when, in turn, inserted between the first to third supporting walls 54 to 56 and the peripheral walls 58, in the axial direction from the tips of the first to third supporting walls 54 to 56 toward the upper surface 53a of the outer flange 53.

When the respective held portions 412, 422, and 432 of the first to fourth bus rings 41 to 44 cross over the projection 57, the second supporting wall 55 elastically deforms and curves toward the outer wall 51. When the first to fourth bus rings 41 to 44 are held, the projection 57 locks the fourth bus ring 44 and prevents the fourth bus ring 44 slipping out. This also prevents the first, second, and third bus rings 41, 42, and 43 from slipping out of the holding portion 33a.

(Motor 1 Producing Method)

Next, a method for producing the motor 1 is described. Note that the production method described below is given as one specific example of the method for producing the motor 1 and it is possible to produce the motor 1 even without depending on this procedure.

The method for producing the motor 1 includes a core assembly producing step, an arranging step, an aligning step, a holding step, a first connecting step, and a second connecting step. Specifically, the core assembly producing step includes mounting insulators 33 to cores 31 respectively and winding windings 32 around respective electrically insulating portions 50 and 60 of the insulators 33 respectively to produce a multiplicity of core assemblies 30. The arranging step includes annularly arranging the multiplicity of core assemblies 30 to form stator 3. The aligning step includes bending at least some of U, V, and W phase windings 32U, 32V, and 32W depending on locations of first, second, and third bus rings 41, 42, and 43, respectively, in the axial direction of the stator 3, and aligning the U, V, and W phase windings 32U, 32V, and 32W with connecting portions of the first, second, and third bus rings 41, 42, and 43, respectively. The holding step includes holding first to fourth bus rings 41 to 44 in respective holding portions 33a of the insulators 33. The first connecting step includes connecting together respective one ends 321U, 321V, and 321W of the U, V, and W phase windings 32U, 32V, and 32W, and the first, second, and third bus rings 41, 42, and 43 respectively. The second connecting step includes connecting together the respective other ends 322U, 322V, and 322W of the U, V, and W phase windings 32U, 32V, and 32W, and the fourth bus ring 44.

FIGS. 10A to 10C are explanatory diagrams showing the holding step and the aligning step. In the present embodiment, the holding step and the aligning step are performed at the same time.

In the holding step, the third bus ring 43, the second bus ring 42, the first bus ring 41 and the fourth bus ring 44 are, in turn and in this order, inserted into a receiving space S between the first to third supporting walls 54 to 56 and the peripheral wall 58 of each insulator 33. The fourth bus ring 44 is then locked to the projection 57, resulting in the first to fourth bus rings 41 to 44 being held in the holding portion 33a of each insulator 33.

When the third bus ring 43, the second bus ring 42, and the first bus ring 41 are inserted into the receiving space S, the respective one ends 321U, 321V, and 321W of the U, V, and W phase windings 32U, 32V, and 32W and the respective connecting portions 41a, 42a, and 43a of the first, second, and third bus rings 41, 42, and 43 are aligned with each other respectively. That is, as shown in FIG. 9A, before the first, second, and third bus rings 41, 42, and 43 are inserted into the receiving space S, one end 321 of the winding 32 is oblique to the radial direction of the stator 3 in such a manner that its distance from the upper surface 53a of the outer flange 53 increases toward its tip, but as shown in FIG. 10A, when the third bus ring 43 is inserted into the receiving space S, the W phase winding 32W is bent downward by the third bus ring 43 moving downward (toward the upper surface 53a) with one end 321W of the W phase winding 32W inserted in the U shaped portion 431 of the connecting portion 43a.

Also, as shown in FIG. 10B, when the second bus ring 42 is arranged on the third bus ring 43, the V phase winding 32V is bent downward by the second bus ring 42 moving downward with one end 321V of the V phase winding 32V inserted in the U shaped portion 421 of the connecting portion 42a. Still further, as shown in FIG. 10C, when the first bus ring 41 is arranged on the second bus ring 42, one end 321U of the U phase winding 32U is inserted in the U shaped portion 411 of the connecting portion 41a. Note that in the present embodiment, when the first bus ring 41 is inserted into the receiving space S, the one end 321U of the U phase winding 32U on the core assembly 30 is set at such a location and a slope angle that the U phase winding 32U is not bent.

Figure 11A:
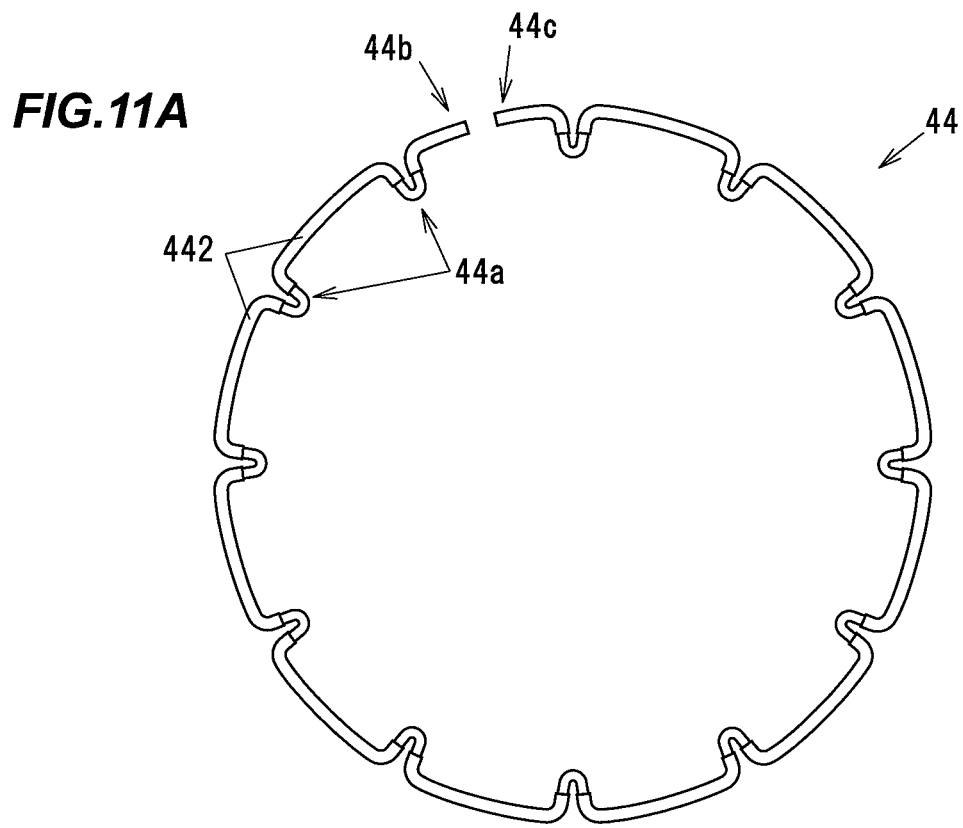
FIG. 11A is a plan view showing the fourth bus ring before performing the holding step.
Figure 11B:
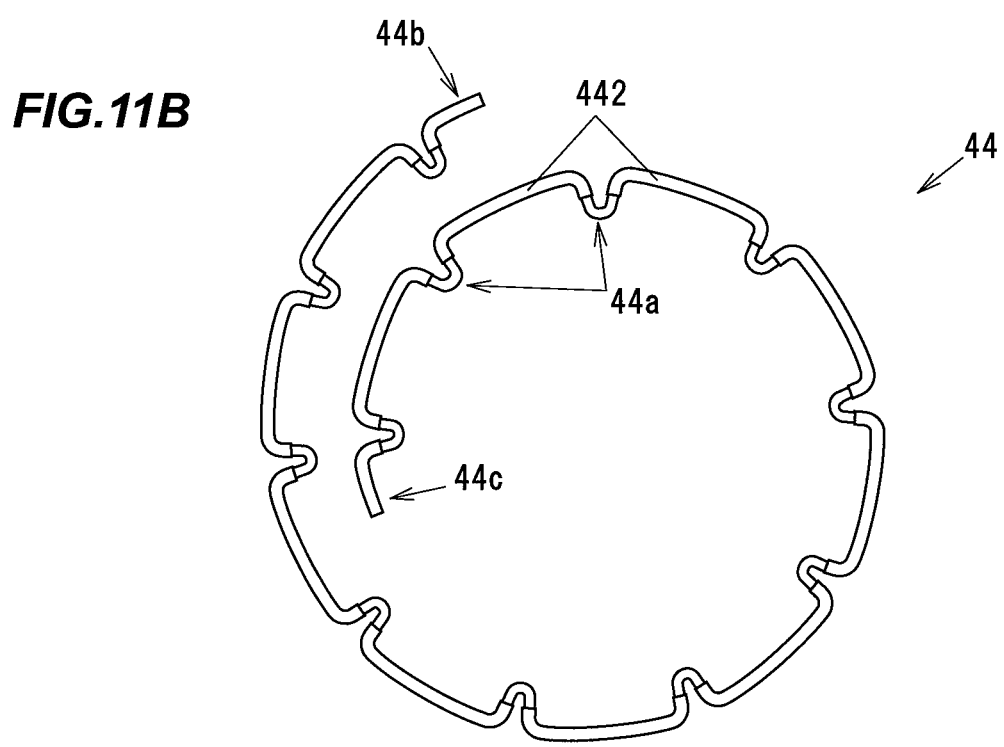
FIG. 11B is a plan view showing the fourth bus ring when inserted into a receiving space in the holding step.

FIG. 11A is a plan view showing the fourth bus ring 44 before performing the holding step, and FIG. 11B is a plan view showing the fourth bus ring 44 when inserted into the receiving space S in the holding step.

As shown in FIG. 11A, the fourth bus ring 44 is molded into a ring shape by bending one insulated wire. Both ends 44b and 44c of this insulated wire are free ends respectively without being connected together.

When the fourth bus ring 44 is inserted into the receiving spaces S, the entire fourth bus ring 44 is elastically radially contracted so that its circumferential portions radially overlap together as shown in FIG. 11B, and the fourth bus ring 44 is inserted into, in turn, the respective receiving spaces S of the plurality of insulators 33. Because in the example shown in FIG. 11B one end 44b of the fourth bus ring 44 lies on the outer periphery relative to the other end 44c thereof, the plurality of held portions 442 between the connecting portions 44a respectively are, in turn, inserted from the one end 44b toward the other end 44c into the respective receiving spaces S of the plurality of insulators 33.

The radially contracted fourth bus ring 44 radially expands due to its restoring force, but the movement in the radial direction of each held portion 442 is regulated by the respective peripheral walls 58 of the insulators 33. Also, because, as described previously, the respective other ends 322U, 322V, and 322W of the windings 32 are drawn out of the respective lead-out portions 59 of the insulators 33 in the axial direction, the radial expansion of the radially contracted fourth bus ring 44 due to its restoring force allows the respective other ends 322U, 322V, and 322W of the windings 32 to be located deep in the radial directions into the U shaped connecting portions 44a respectively.

That is, with the fourth bus ring 44 elastically radially contracted, the respective other ends 322U, 322V, and 322W of the U, V, and W phase windings 32U, 32V, and 32W are inserted into the U shaped connecting portions 44a, respectively, of the fourth bus ring 44, and due to the radial expansion of the fourth bus ring 44 caused by its restoring force, those other ends 322U, 322V, and 322W are located deep into the U shaped connecting portions 44a, respectively, of the fourth bus ring 44. Thereafter, the U shaped connecting portions 44a with the respective other ends 322U, 322V, and 322W of the U, V, and W phase windings 32U, 32V, and 32W respectively inserted therein are caulked so that the U, V, and W phase windings 32U, 32V, and 32W and the fourth bus ring 44 are electrically connected together.

Figure 12A:
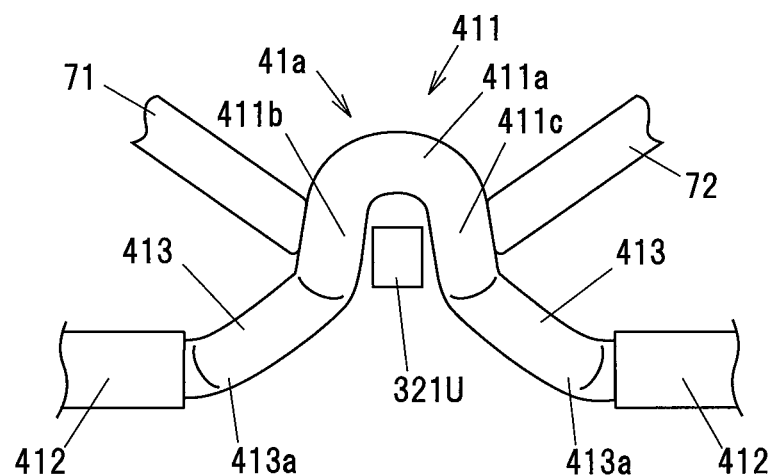
FIG. 12A is a schematic view showing a U shaped portion of the first bus ring and one end of a U phase winding before performing a first connecting step.
Figure 12B:
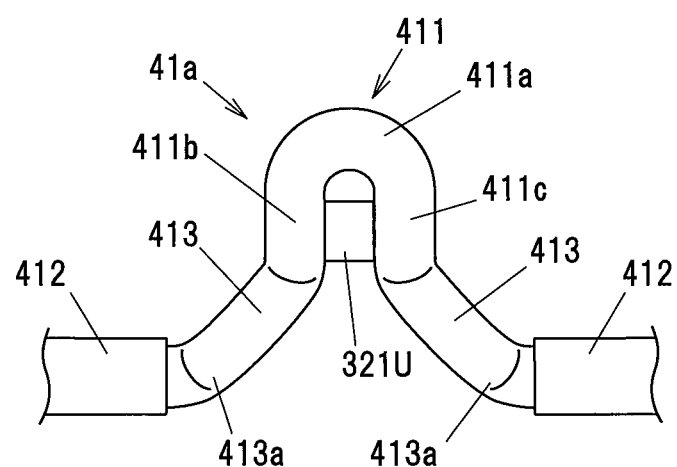
FIG. 12B is a schematic view showing the U shaped portion of the first bus ring and that one end of the U phase winding after performing the first connecting step.

FIG. 12A is a schematic view showing the U shaped portion 411 of the first bus ring 41 and one end 321U of the U phase winding 32U before performing a first connecting step, and FIG. 12B is a schematic view showing the U shaped portion 411 of the first bus ring 41 and that one end 321U of the U phase winding 32U after performing the first connecting step. Note that although FIGS. 12A and 12B show connection of one end 321U of the U phase winding 32U to the U shaped portion 411 of the first bus ring 41 as an example, the connections between the respective U shaped portions 421 and 431 of the second and third bus rings 42 and 43 and the respective one ends 321V and 321W of the V and W phase windings 32V and 32W respectively can likewise be performed.

The first, second, and third bus rings 41, 42, and 43 and the U, V, and W phase windings 32U, 32V, and 32W respectively are electrically connected together by caulking the U shaped portions 411, 421, and 431 with the respective one ends 321U, 321V, and 321W of the U, V, and W phase windings 32U, 32V, and 32W respectively inserted therein.

More specifically, in the present embodiment, these connections are performed by heat caulking (fusing). That is, the first, second, and third bus rings 41, 42, and 43 and the U, V, and W phase windings 32U, 32V, and 32W respectively are electrically connected together by caulking while heating the U shaped portions 411, 421, and 431 with the respective one ends 321U, 321V, and 321W of the U, V, and W phase windings 32U, 32V, and 32W inserted therein respectively. The U shaped portions 411, 421, and 431 are pre-plated with tin, so that the first, second, and third bus rings 41, 42, and 43 and the U, V, and W phase windings 32U, 32V, and 32W respectively are more securely electrically connected together by the tin plate melting due to heating.

This heat caulking is performed as follows: As shown in FIG. 12A, a positive electrode 71 is brought into contact with a shaft 411b of the U shaped portion 411, while a negative electrode 72 is brought into contact with a shaft 411c of the U shaped portion 411. With the shafts 411b and 411c being pressed against one end 321U of the U phase winding 32U with the positive electrode 71 and the negative electrode 72, direct current voltage is applied between the positive electrode 71 and the negative electrode 72. Then, direct current flows, in turn through the positive electrode 71, the shaft 411b of the U shaped portion 411, one end 321U of the U phase winding 32U, the shaft 411c of the U shaped portion 411, and the negative electrode 72. Joule heat resulting from the direct current flowing first melts the tin plate and then partially the shafts 411b and 411c of the U shaped portion 411 and the end 321U of the U phase winding 32U. This results in the electrical connection between the U shaped portion 411 of the first bus ring 41 and the one end 321U of the U phase winding 32U.

Note that as shown in FIG. 12B, this heat caulking narrows the distance between the one pair of shafts 411b and 411c, but this variation in the distance between the shafts 411b and 411c is cancelled out by variations in slopes of one pair of extended portions 413 of the connecting portion 41a. That is, in the first connecting step, one end 321U of the U phase winding 32U is inserted in the U shaped portion 411 of the first bus ring 41, caulked by both sides of the U shaped portion 411 in the circumferential direction of the first bus ring 41, and clamped between the one pair of shafts 411b and 411c of the U shaped portion 411, so that the one end 321U of the U phase winding 32U is electrically connected to the U shaped portion 411 of the first bus ring 41 with the one pair of extended portions 413 being not in contact with each other, with the bent portions 413a being not in contact with each other, and with the first bus ring 41 being prevented from radial contraction due to the caulking, after the connection.

Note that, as with the first bus ring 41, for the second and third bus rings 42 and 43, their respective pairs of extended portions 423 and 433 are not in contact with each other, respectively, with their respective U shaped portions 421 and 431 connected to the respective one ends 321V and 321W of the windings 32V and 32W, respectively.

Functions and Advantageous Effects of the First Embodiment

The above described embodiment has the following functions and advantageous effects.

(1) The first to fourth bus rings 41 to 44 are held in the holding portions 33a formed on the insulators 33. Therefore, for example, there is no need of integrating together the first to fourth bus rings 41 to 44 with a molded resin. Thus, it is possible to lower production cost for the electrical collecting and distributing ring 4 and the motor 1.

(2) The first to fourth bus rings 41 to 44 are supported to the first, second, and third supporting walls 54, 55, and 56, and their movements in the axial direction of the stator 3 are regulated by the projections 57 so that the first to fourth bus rings 41 to 44 are prevented from slipping. The first to fourth bus rings 41 to 44 can therefore securely be held in the holding portions 33a.

(3) The first to fourth bus rings 41 to 44 are held in the holding portions 33a by crossing over the projections 57 provided at the ends of the second supporting walls 55 respectively in the axial direction of the stator 3. The held portions 412, 422, 432, and 442 of the first to fourth bus rings 41 to 44, once inserted in the receiving spaces S, are therefore prevented from easily slipping out of the receiving spaces S. Also, because, as described previously, the first to fourth bus rings 41 to 44 are in contact with each other, the formation of the projections 57 in contact with the uppermost fourth bus ring 44 (at the longest distance from the upper surfaces 53a of the outer flanges 53 respectively) of the first to fourth bus rings 41 to 44 allows for preventing slipping of the first to fourth bus rings 41 to 44. Thus, no antislip mechanism to prevent respective slippings of the first, second, and third bus rings 41, 42, and 43 individually is required.

(4) The first, second, and third supporting walls 54, 55, and 56 extend in the axial direction of the stator 3, and the first to fourth bus rings 41 to 44 are held on the outer side of the first, second, and third supporting walls 54, 55, and 56 in the radial direction of the stator 3. Therefore, even in the event of the occurrence of radial contractions of the first, second, and third bus rings 41, 42, and 43 due to the caulking of the U shaped portions 411, 421, and 431, the held portions 412, 422, and 423 are pressed against the first, second, and third supporting walls 54, 55, and 56 due to the radial contractions. The first, second, and third bus rings 41, 42, and 43 can therefore more securely be held in the holding portions 33a.

(5) The first to fourth bus rings 41 to 44 are clamped between the first to third supporting walls 54 to 56 and the peripheral walls 58. Therefore, for example, it is possible to prevent a circumferential portion of the fourth bus ring 44 from radially expanding, crossing over the projections 57 and slipping out, and thereby more securely hold the first to fourth bus rings 41 to 44 in the holding portions 33a.

(6) The first, second, and third bus rings 41, 42, and 43 are each formed with their respective U shaped portions 411, 421, and 431, held portions 412, 422, and 432, and extended portions 413, 423, and 433, by bending one electrically insulated wire, and are electrically connected to the U, V, and W phase windings 32U, 32V, and 32W respectively with the respective one ends 321U, 321V, and 321W of the U, V, and W phase windings 32U, 32V, and 32W inserted in the respective U shaped portions 411, 421, and 431 of the first, second, and third bus rings 41, 42, and 43 respectively. Therefore, for example, there is no need of using connecting terminals to connect together the first, second, and third bus rings 41, 42, and 43 and the U, V, and W phase windings 32U, 32V, and 32W respectively. Thus, it is possible to enhance production efficiency and lower production cost for the electrical collecting and distributing ring 4 and the motor 1.

(7) The first, second, and third bus rings 41, 42, and 43 and the U, V, and W phase windings 32U, 32V, and 32W are connected together by heat caulking the U shaped portions 411, 421, and 431 respectively. Therefore, their respective firm connections are possible.

(8) The U shaped portions 411, 421, and 431 are pre-plated with tin. The first, second, and third bus rings 41, 42, and 43 and the U, V, and W phase windings 32U, 32V, and 32W respectively are therefore more securely electrically connected together by the tin plate melting due to heating in heat caulking.

(9) The first, second, and third supporting walls 54, 55, and 56 are spaced apart in the circumferential direction of the stator 3. Therefore, it is possible to radially inwardly protrude the respective connecting portions 41a, 42a, and 43a of the first, second, and third bus rings 41, 42, and 43 from between the first supporting walls 54 and the second supporting walls 55 respectively and the connecting portions 44a of the fourth bus ring 44 from between the third supporting walls 56 and the second supporting walls 55 respectively, and thereby easily connect the connecting portions 41a, 42a, and 43a to the respective one ends 321 respectively of the windings 32 and the connecting portions 44a to the respective other ends respectively of the windings 32.

(10) The pitch between the first supporting walls 54 and the second supporting walls 55 accommodates the width of the respective connecting portions 41a, 42a, and 43a of the first, second, and third bus rings 41, 42, and 43 in the circumferential directions of the first, second, and third bus rings 41, 42, and 43, while the pitch between the third supporting walls 56 and the second supporting walls 55 accommodates the width of the connecting portions 44a of the fourth bus ring 44 in the circumferential direction of the fourth bus ring 44. Therefore, it is possible to position the U shaped portions 411, 421, and 431 opposite the notches 51a respectively, i.e. at locations for the respective one ends 321U, 321V, and 321W respectively of the U, V, and W phase windings 32U, 32V, and 32W to be inserted thereat. Thus, assembling thereof is enhanced.

(11) The first, second, and third bus rings 41, 42, and 43 are identically shaped, and the respective one ends 321V and 321W of the V and W phase windings 32V and 32W are bent depending on locations of the respective connecting portions 42a and 43a in the radial directions, respectively, of the second and third bus rings 42 and 43. Therefore, it is possible to reduce the number of kinds of parts in the electrical collecting and distributing ring 4 and the motor 1, also reduce the occurrence of defective products due to misassembling, and securely electrically connect together the first, second, and third bus rings 41, 42, and 43 and the U, V, and W phase windings 32U, 32V, and 32W respectively.

(12) The respective pairs of extended portions 413, 423, and 433 are not in contact with each other, respectively, with the respective U shaped portions 411, 421, and 431 connected to the respective one ends 321U, 321V, and 321W of the U, V, and W phase windings 32U, 32V, and 32W, respectively. Therefore, it is possible to securely connect together the first, second, and third bus rings 41, 42, and 43 and the U, V, and W phase windings 32U, 32V, and 32W respectively without contacts between the respective pairs of extended portions 413, 423, and 433 preventing the caulking of the respective U shaped portions 411, 421, and 431, and it is possible to suppress the occurrence of radial contractions of the first, second, and third bus rings 41, 42, and 43 due to the caulking of the U shaped portions 411, 421, and 431.

Note that although in the present embodiment, it has been described that the respective one ends 321 of the windings 32 are protruded beforehand upward (in such a direction that its distance from the upper surface 53a of the outer flange 53 increases) and then that the windings 32 protruded from the outer wall 51 are bent downward (toward the outer flange 53) depending on locations of the first, second, and third bus rings 41, 42, and 43, respectively, in the axial direction of the stator 3, the respective one ends 321 of the windings 32 may inversely be protruded downward beforehand and then bent upward depending on locations of the first, second, and third bus rings 41, 42, and 43, respectively. That is, when the first, second, and third bus rings 41, 42, and 43 are identically shaped, the effect of the present embodiment can be achieved by bending at least some of the U, V, and W phase windings 32U, 32V, and 32W depending on locations of the first, second, and third bus rings 41, 42, and 43, respectively, in the axial direction of the stator 3.

Second Embodiment

Next, a second embodiment of the present invention is described.

Figure 13A:
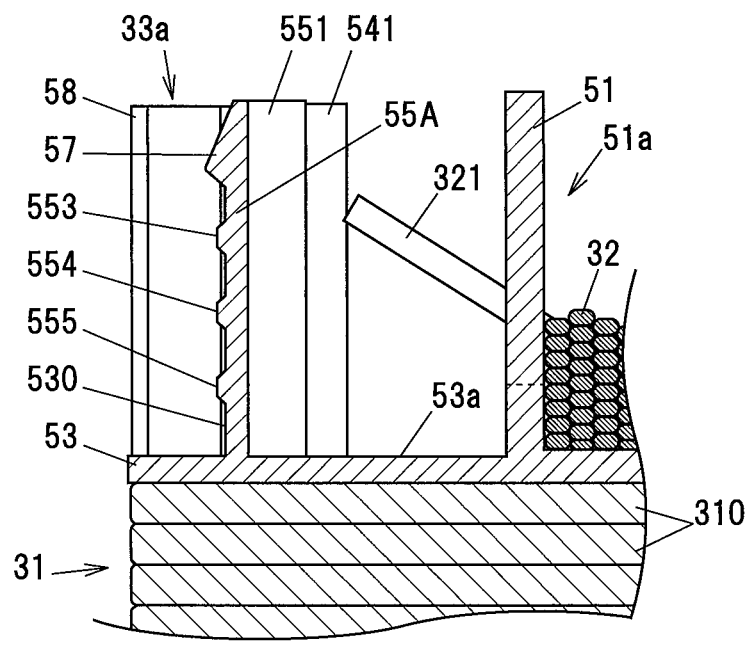
FIGS. 13A and 13B are enlarged cross-sectional views showing a second supporting wall of an insulator in a second embodiment.
Figure 13B:
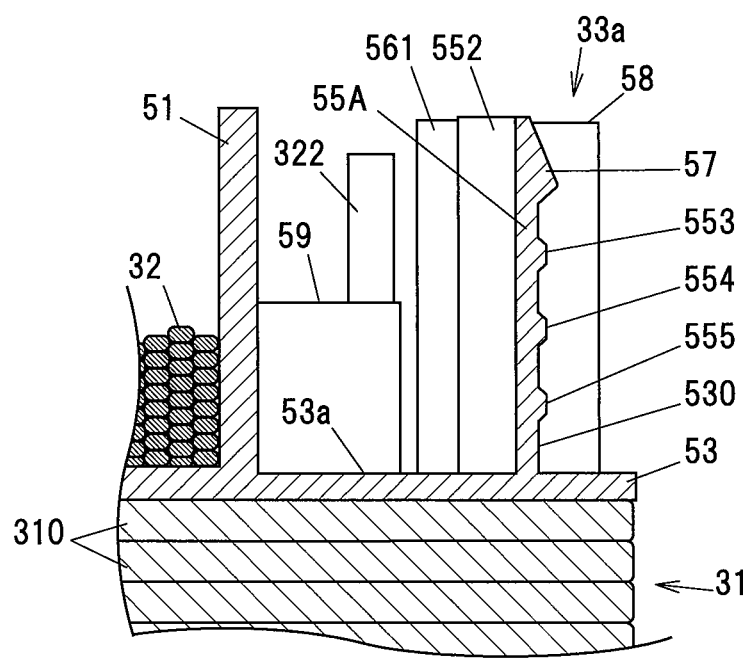

FIGS. 13A and 13B are enlarged cross-sectional views showing a second supporting wall 55A of an insulator 33 in a second embodiment. Because the insulator 33 in the second embodiment is similar to that of the first embodiment except that its second supporting wall 55A is different in shape from the second supporting wall 55 in the first embodiment, elements in common with those described for the first embodiment are given the same numerals or characters used in the first embodiment, and duplicated descriptions thereof are omitted.

The second supporting wall 55A in the present embodiment is formed with first, second, and third projecting portions 553, 554, and 555 on its outer peripheral surface 550. The respective projecting lengths of the first, second, and third projecting portions 553, 554, and 555 in the radial direction from the outer peripheral surface 550 are shorter than the projecting length of the projecting portion 57 in the radial direction from the outer peripheral surface 550. For this reason, the axial pressing force required for the first to third bus rings 41 to 43 to cross over the first, second, and third projecting portions 553, 554, and 555 is smaller than the axial pressing force required for the first to fourth bus rings 41 to 44 to cross over the projecting portion 57.

When the first to fourth bus rings 41 to 44 are held in the holding portion 33a, the first projecting portion 553 is located between the first bus ring 41 and the fourth bus ring 44, and the second projecting portion 554 is located between the second bus ring 42 and the first bus ring 41. Also, the third projecting portion 555 is located between the third bus ring 43 and the second bus ring 42.

With the present embodiment, even if the first to third bus rings 41 to 43 are subjected to such an axial force as to cause them to slip out of the holding portion 33a, that force acts on the first, second, and third projecting portions 553, 554, and 555, and the first to third bus rings 41 to 43 are acted on by the reaction force from the first, second, and third projecting portions 553, 554, and 555, and are therefore prevented from slipping out of the holding portion 33a.

Note that the first, second, and third projecting portions 553, 554, and 555 may be formed over the entire width (in the circumferential direction of the stator 3) of the second supporting wall 55A, or may only partially be formed in the width direction of the second supporting wall 55A. Also, although in FIGS. 13A and 13B, the first, second, and third projecting portions 553, 554, and 555 are illustrated as being trapezoidal in cross sectional shape, the first, second, and third projecting portions 553, 554, and 555 are not particularly limited in cross sectional shape, but may be, for example, semicircular in cross sectional shape. Still further, some of the first, second, and third projecting portions 553, 554, and 555 may be omitted.

Summary of the Embodiment

Next, the technical concept that is ascertained from the embodiment described above will be described with the aid of reference characters and the like in the embodiment. It should be noted, however, that each of the reference characters in the following description should not be construed as limiting the constituent elements in the claims to the members and the like specifically shown in the embodiment.

[1] An electrical collecting and distributing member (41, 42, 43, and 44) holding structure, comprising: a stator (3) including a multiplicity of cores (31) arranged annularly, windings (32) wound around the multiplicity of cores (31) respectively, and an insulator (33) for electrical insulation between the cores (31) and the windings (32); a plurality of annular electrical collecting and distributing members (41, 42, 43, and 44) held around the stator (3) to collect and distribute electric current to the windings (32); and a holding portion (33a) formed on the insulator (33), the plurality of electrical collecting and distributing members (41, 42, 43, and 44) being held in that holding portion (33a).

[2] The electrical collecting and distributing member (41, 42, 43, and 44) holding structure according to [1] above, wherein the holding portion (33a) includes a supporting portion (54, 55, 56), which supports the plurality of electrical collecting and distributing members (41, 42, 43, and 44) together in an axial direction of the stator (3), and a regulating portion (57) to regulate movement in the axial direction of the plurality of electrical collecting and distributing members (41, 42, 43, and 44) relative to that supporting portion (54, 55, 56).

[3] The electrical collecting and distributing member (41, 42, 43, and 44) holding structure according to [2] above, wherein the regulating portion (57) includes a projection (57), which is provided at an end of the supporting portion (54, 55, 56) in the axial direction of the stator (3), and which projects in a radial direction of the stator (3), so that the plurality of electrical collecting and distributing members (41, 42, 43, and 44) are held in the holding portion (33a) by crossing over that projection (57) when moved in the axial direction relative to the holding portion (33a).

[4] The electrical collecting and distributing member (41, 42, 43, and 44) holding structure according to [2] above, wherein the supporting portion (54, 55, 56) extends in the axial direction of the stator (3), and the plurality of electrical collecting and distributing members (41, 42, 43, and 44) are held on an outer side of the supporting portion (54, 55, 56) in the radial direction of the stator (3).

[5] The electrical collecting and distributing member (41, 42, 43, and 44) holding structure according to [4] above, wherein the holding portion (33a) further includes a peripheral wall (58), which is formed outward in the radial direction of the stator (3) relative to the plurality of electrical collecting and distributing members (41, 42, 43, and 44), and which is opposite the plurality of electrical collecting and distributing members (41, 42, 43, and 44) in the radial direction of the stator (3).

[6] The electrical collecting and distributing member (41, 42, 43, and 44) holding structure according to [1] above, wherein the electrical collecting and distributing members (41, 42, and 43) integrally include a respective U shaped portion (411, 421, and 431), which is formed by bending a metal conductor (400) into a U shape, respective held portions (412, 422, and 432), which are held in the holding portion (33a), and a respective pair of extended portions (413, 423, and 433), which are provided between both ends of the respective U shaped portion (411, 421, and 431) and the respective held portions (412, 422, and 432), respectively, by extension in a radial direction of the annular electrical collecting and distributing members (41, 42, and 43), wherein the electrical collecting and distributing members (41, 42, and 43) and the windings (32) are electrically connected together with a respective end (321) of the windings (32) inserted in the respective U shaped portion (411, 421, and 431).

[7] The electrical collecting and distributing member (41, 42, 43, and 44) holding structure according to [6] above, wherein the electrical collecting and distributing members (41, 42, and 43) and the windings (32) are electrically connected together by caulking the respective U shaped portion (411, 421, and 431) with the respective end (321) of the windings (32) inserted therein.

[8] The electrical collecting and distributing member (41, 42, 43, and 44) holding structure according to [6] above, wherein the respective U shaped portion (411, 421, and 431) is plated with tin, and the electrical collecting and distributing members (41, 42, and 43) and the windings (32) are electrically connected together by heat caulking the respective U shaped portion (411, 421, and 431) with the respective end (321) of the windings (32) inserted therein.

[9] The electrical collecting and distributing member (41, 42, 43, and 44) holding structure according to [7] above, wherein the respective pair of extended portions (413, 423, and 433) are not in contact with each other with the respective U shaped portion (411, 421, and 431) electrically connected to the respective end (321) of the windings (32).

[10] The electrical collecting and distributing member (41, 42, 43, and 44) holding structure according to [9] above, wherein a plurality of the supporting portions (54, 55, 56) are arranged on the stator (3) and spaced in a circumferential direction of the stator (3), and the electrical collecting and distributing members (41, 42, and 43) are arranged in such a manner that respective connecting portions (41a, 42a, and 43a) thereof to be connected to the windings (32) project from between pairs of the adjacent supporting portions (54 and 55) in the circumferential direction of the stator (3) inward in radial directions, respectively, of the stator (3).

[11] The electrical collecting and distributing member (41, 42, 43, and 44) holding structure according to [10] above, wherein a pitch between the pairs of the adjacent supporting portions (54 and 55) in the circumferential direction of the stator (3) accommodates a width ($W_U$) of the respective connecting portions (41a, 42a, and 43a) in circumferential directions of the electrical collecting and distributing members (41, 42, and 43).

[12] The electrical collecting and distributing member (41, 42, 43, and 44) holding structure according to [1] above, wherein the plurality of electrical collecting and distributing members (41, 42, and 43) are in identical shapes.

[13] The electrical collecting and distributing member (41, 42, 43, and 44) holding structure according to [12] above, wherein at least some of the plurality of windings (32) are bent depending on locations of the plurality of electrical collecting and distributing members (41, 42, and 43), respectively, in the axial direction of the stator (3).

[14] An electric motor (1), comprising: a stator (3) including a multiplicity of cores (31) arranged annularly, U, V, and W phase windings (32U, 32V, and 32W) wound around the multiplicity of cores (31) respectively, and an insulator (33) for electrical insulation between the cores (31) and the U, V, and W phase windings (32U, 32V, and 32W); a first annular electrical collecting and distributing member (41) to collect and distribute electric current to the U phase winding (32U); a second annular electrical collecting and distributing member (42) to collect and distribute electric current to the V phase winding (32V); and a third annular electrical collecting and distributing member (43) to collect and distribute electric current to the W phase winding (32W), wherein the insulator (33) includes a holding portion (33a), and the first, second, and third electrical collecting and distributing members (41, 42, and 43) are being held in that holding portion (33a).

[15] The electric motor (1) according to [14] above, further comprising
a fourth neutral phase annular electrical collecting and distributing member (44), which is held in the holding portion (33a) together with the first, second, and third electrical collecting and distributing members (41, 42, and 43), and which is connected to the U, V, and W phase windings (32U, 32V, and 32W),
wherein the fourth electrical collecting and distributing member (44) includes a multiplicity of connecting portions (44a), which are in a U shape being open inward in radial directions, respectively, of the fourth annular electrical collecting and distributing member (44), and the fourth electrical collecting and distributing member (44) is electrically connected to the U, V, and W phase windings (32U, 32V, and 32W) by caulking its connecting portions (44a) with respective ends (322U, 322V, and 322W) of the U, V, and W phase windings (32U, 32V, and 32W) inserted therein respectively.

[16] A method for producing the electric motor (1) according to [14] above, comprising: holding the first, second, and third electrical collecting and distributing members (41, 42, and 43) in the holding portion (33a); and connecting together the U, V, and W phase windings (32U, 32V, and 32W) and the first, second, and third electrical collecting and distributing members (41, 42, and 43), respectively.

[17] The electric motor (1) producing method according to [16] above, further comprising
bending at least some of the U, V, and W phase windings (32U, 32V, and 32W) depending on locations of the first, second, and third electrical collecting and distributing members (41, 42, and 43), respectively, in an axial direction of the stator (3), and aligning the U, V, and W phase windings with connecting portions (411, 421, and 431) of the first, second, and third electrical collecting and distributing members (41, 42, and 43), respectively.

[18] The electric motor (1) producing method according to [15] above, wherein
with the fourth electrical collecting and distributing member (44) elastically radially contracted, the respective ends (322U, 322V, and 322W) of the U, V, and W phase windings (32U, 32V, and 32W) are inserted into the connecting portions (44a), respectively, of the fourth electrical collecting and distributing member (44), and due to radial expansion of the fourth electrical collecting and distributing member (44) caused by restoration, the respective ends (322U, 322V, and 322W) of the U, V, and W phase windings (32U, 32V, and 32W) are located deep into the connecting portions (44a), respectively.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. An electrical collecting and distributing member holding structure, comprising:
a stator including a multiplicity of cores arranged annularly, windings wound around the multiplicity of cores respectively, and an insulator for electrical insulation between the cores and the windings;
a plurality of annular electrical collecting and distributing members held around the stator to collect and distribute electric current to the windings; and
a holding portion formed on the insulator, the plurality of electrical collecting and distributing members being held in that holding portion,
wherein the holding portion includes a supporting portion, which supports the plurality of electrical collecting and distributing members together in an axial direction of the stator, and a regulating portion to regulate movement in the axial direction of the plurality of electrical collecting and distributing members relative to that supporting portion, and
wherein the regulating portion includes a projection, which is provided at an end of the supporting portion in the axial direction of the stator, and which projects in a radial direction of the stator, so that the plurality of electrical collecting and distributing members are held in the holding portion by crossing over that projection when moved in the axial direction relative to the holding portion.

2. The electrical collecting and distributing member holding structure according to claim 1, the supporting portion extends in the axial direction of the stator, and the plurality of electrical collecting and distributing members are held on an outer side of the supporting portion in the radial direction of the stator.

3. The electrical collecting and distributing member holding structure according to claim 2, wherein the holding portion further includes a peripheral wall, which is formed outward in the radial direction of the stator relative to the plurality of electrical collecting and distributing members, and which is opposite the plurality of electrical collecting and distributing members in the radial direction of the stator.

4. The electrical collecting and distributing member holding structure according to claim 1, wherein the electrical collecting and distributing members integrally include a respective U shaped portion, which is formed by bending a metal conductor into a U shape, respective held portions, which are held in the holding portion, and a respective pair of extended portions, which are provided between both ends of the respective U shaped portion and the respective held portions, respectively, by extension in a radial direction of the annular electrical collecting and distributing members, wherein the electrical collecting and distributing members and the windings are electrically connected together with a respective end of the windings inserted in the respective U shaped portion.

5. The electrical collecting and distributing member holding structure according to claim 4, wherein the electrical collecting and distributing members and the windings are electrically connected together by caulking the respective U shaped portion with the respective end of the windings inserted therein.

6. The electrical collecting and distributing member holding structure according to claim 4, wherein the respective U shaped portion is plated with tin, and the electrical collecting and distributing members and the windings are electrically connected together by heat caulking the respective U shaped portion with the respective end of the windings inserted therein.

7. The electrical collecting and distributing member holding structure according to claim 5, wherein the respective pair of extended portions are not in contact with each other in a state where the respective U shaped portion is electrically connected to the respective end of the windings.

8. An electrical collecting and distributing member holding structure, comprising:
   a stator including a multiplicity of cores arranged annularly, windings wound around the multiplicity of cores respectively, and an insulator for electrical insulation between the cores and the windings;
   a plurality of annular electrical collecting and distributing members held around the stator to collect and distribute electric current to the windings; and
   a holding portion formed on the insulator, the plurality of electrical collecting and distributing members being held in that holding portion,
   wherein the electrical collecting and distributing members integrally include a respective U shaped portion, which is formed by bending a metal conductor into a U shape, respective held portions, which are held in the holding portion, and a respective pair of extended portions, which are provided between both ends of the respective U shaped portion and the respective held portions, respectively, by extension in a radial direction of the annular electrical collecting and distributing members, wherein the electrical collecting and distributing members and the windings are electrically connected together with a respective end of the windings inserted in the respective U shaped portion,
   wherein the electrical collecting and distributing members and the windings are electrically connected together by caulking the respective U shaped portion with the respective end of the windings inserted therein,
   wherein the respective pair of extended portions are not in contact with each other with the respective U shaped portion electrically connected to the respective end of the windings,
   wherein a plurality of the supporting portions are arranged on the stator and spaced in a circumferential direction of the stator, and the electrical collecting and distributing members are arranged in such a manner that respective connecting portions thereof to be connected to the windings project from between pairs of the adjacent supporting portions in the circumferential direction of the stator inward in radial directions, respectively, of the stator.

9. An electrical collecting and distributing member holding structure, comprising:
   a stator including a multiplicity of cores arranged annularly, windings wound around the multiplicity of cores respectively, and an insulator for electrical insulation between the cores and the windings;
   a plurality of annular electrical collecting and distributing members held around the stator to collect and distribute electric current to the windings; and
   a holding portion formed on the insulator, the plurality of electrical collecting and distributing members being held in that holding portion,
   wherein the electrical collecting and distributing members integrally include a respective U shaped portion, which is formed by bending a metal conductor into a U shape, respective held portions, which are held in the holding portion, and a respective pair of extended portions, which are provided between both ends of the respective U shaped portion and the respective held portions, respectively, by extension in a radial direction of the annular electrical collecting and distributing members, wherein the electrical collecting and distributing members and the windings are electrically connected together with a respective end of the windings inserted in the respective U shaped portion,
   wherein the electrical collecting and distributing members and the windings are electrically connected together by caulking the respective U shaped portion with the respective end of the windings inserted therein,
   wherein a plurality of the supporting portions are arranged on the stator and spaced in a circumferential direction of the stator, and the electrical collecting and distributing members are arranged in such a manner that respective connecting portions thereof to be connected to the windings project from between pairs of the adjacent supporting portions in the circumferential direction of the stator inward in radial directions, respectively, of the stator, wherein a plurality of the supporting portions are arranged on the stator and spaced in a circumferential direction of the stator, and the electrical collecting and distributing members are arranged in such a manner that respective connecting portions thereof to be connected to the windings project from between pairs of the adjacent supporting portions in the circumferential direction of the stator inward in radial directions, respectively, of the stator, and
   wherein a pitch between the pairs of the adjacent supporting portions in the circumferential direction of the stator accommodates a width of the respective connecting portions in circumferential directions of the electrical collecting and distributing members.

10. The electrical collecting and distributing member holding structure according to claim 1, wherein the plurality of electrical collecting and distributing members are in identical shapes.

11. The electrical collecting and distributing member holding structure according to claim 10, wherein at least some of the plurality of windings are bent depending on locations of the plurality of electrical collecting and distributing members, respectively, in the axial direction of the stator.

* * * * *